United States Patent
Hanlon et al.

(10) Patent No.: US 11,453,732 B2
(45) Date of Patent: *Sep. 27, 2022

(54) POLYETHYLENE COPOLYMERS AND PRODUCTS AND METHODS THEREOF

(71) Applicant: Braskem S.A., Camaçari (BR)

(72) Inventors: Ashley Hanlon, São Paulo (BR); Jonas Alves Fernandes, São Paulo (BR); Mauro Alfredo Soto Oviedo, São Paulo (BR); Hadi Mohammadi, São Paulo (BR); Nei Sebastiao Domingues Junior, São Paulo (BR); Adriane Gomes Simanke, São Paulo (BR); Manoela Ellwanger Cangussu, São Paulo (BR); Markus Busch, São Paulo (BR); Sascha Hintenlang, São Paulo (BR)

(73) Assignee: Braskem S.A., Camaçari (BR)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,508

(22) Filed: Oct. 5, 2020

(65) Prior Publication Data

US 2021/0102015 A1 Apr. 8, 2021

Related U.S. Application Data

(60) Provisional application No. 62/910,620, filed on Oct. 4, 2019.

(51) Int. Cl.
*C08F 210/02* (2006.01)
*C08F 2/04* (2006.01)

(52) U.S. Cl.
CPC .................. *C08F 210/02* (2013.01)

(58) Field of Classification Search
CPC .... C08F 210/02; C08F 218/10; C08F 218/08; C08F 216/36

(Continued)

(56) References Cited

U.S. PATENT DOCUMENTS

| 4,129,714 A | 12/1978 | Colburn et al. |
| 6,479,719 B1 * | 11/2002 | Kotwica ................... C07C 4/22 585/360 |

(Continued)

FOREIGN PATENT DOCUMENTS

| EP | 1433836 A1 | 6/2004 |
| EP | 2514803 A1 | 10/2012 |

(Continued)

OTHER PUBLICATIONS

International Search Report issued in International Application No. PCT/IB2020/020059, dated Dec. 17, 2020 (5 pages).

(Continued)

*Primary Examiner* — Fred M Teskin
(74) *Attorney, Agent, or Firm* — Osha Bergman Watanabe & Burton LLP

(57) ABSTRACT

A polymer composition may include a polymer produced from ethylene, and one or more vinyl carbonyl monomers having the general structure (I):

(Continued)

where $R^1$, $R^2$ and $R^3$ are independently selected from a group consisting of hydrogen, halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles; and Y and Z are independently selected from a group consisting of O, $(CR^{5a}R^{5b})$, $(CHR^{6a})$—$R^{6b}$, phenylene, CH—$OR^7$, and $NR^8$, wherein $R^{5a}$, $R^{5b}$, $R^{6a}$, $R^{6b}$, and $R^8$ are independently selected from a group consisting of hydrogen, halogen, $CH_2$, and alkyl, and wherein $R^7$ is independently selected from a group consisting of hydrogen; halogen; hydroxyl; alkyl; linear ether; cyclic ether; $Si(R^9)_3$, wherein $R^9$ is independently selected from a group consisting of hydrogen, halogen, and alkyl; and (C=O)—$R^{10}$, wherein $R^{10}$ is an alkyl; and $R^4$ is independently selected from a group consisting of halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles, where the polymer composition has a number average molecular weight ($M_n$) ranging from 5 kDa to 10000 kDa obtained by GPC.

46 Claims, 7 Drawing Sheets

(58) Field of Classification Search
USPC .................................................. 526/279, 316
See application file for complete search history.

(56) References Cited

U.S. PATENT DOCUMENTS

2004/0226216 A1* 11/2004 Krull .................... C08F 210/02
　　　　　　　　　　　　　　　　　　　　　　　　44/393
2021/0102014 A1* 4/2021 Hanlon ................ C08F 210/02

FOREIGN PATENT DOCUMENTS

JP　　　　　4783209 B2　　9/2011
WO　　　2010105979 A1　　9/2010

OTHER PUBLICATIONS

Written Opinion issued in International Application No. PCT/IB2020/020059, dated Dec. 17, 2020 (7 pages).
International Search Report issued in International Application No. PCT/IB2020/020058, dated Feb. 24, 2021 (10 pages).
Written Opinion issued in International Application No. PCT/IB2020/020058, dated Feb. 24, 2021 (10 pages).

* cited by examiner

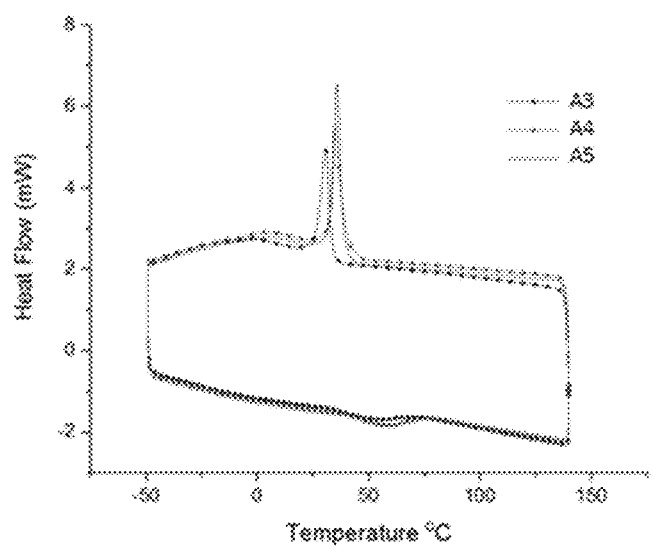
FIG. 7A
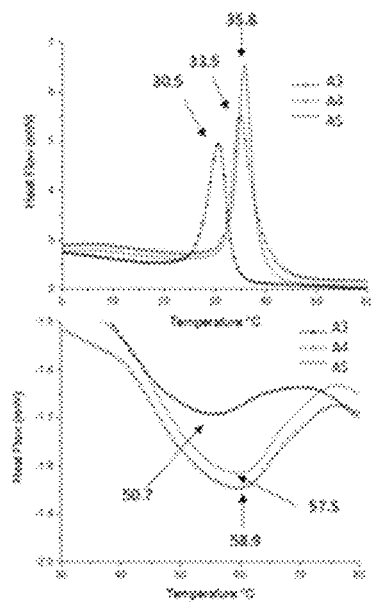
FIG. 7B
FIG. 7C
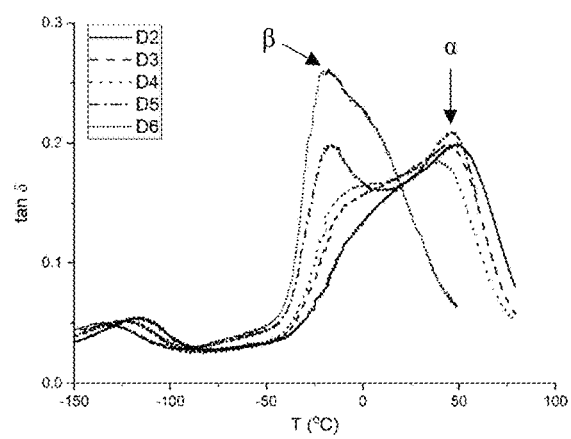
FIG. 8A
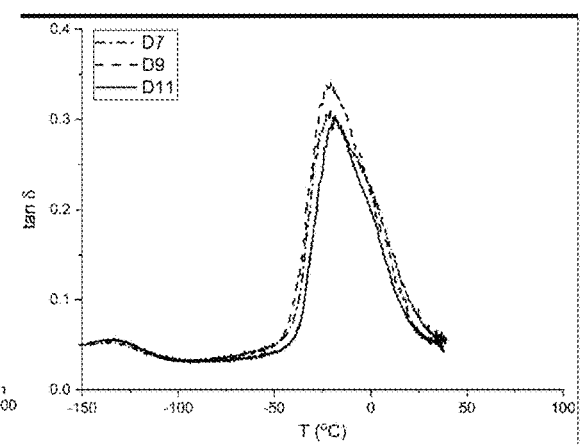
FIG. 8B

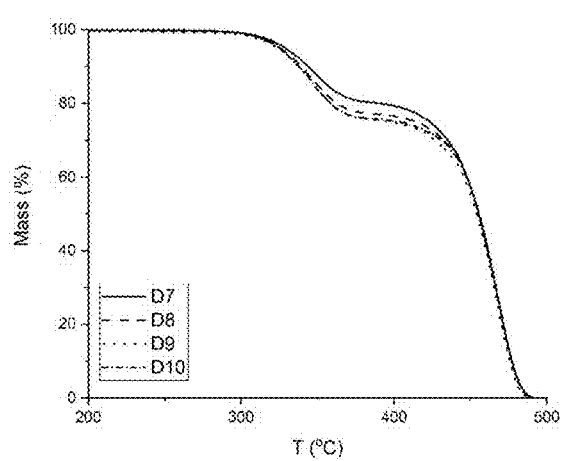 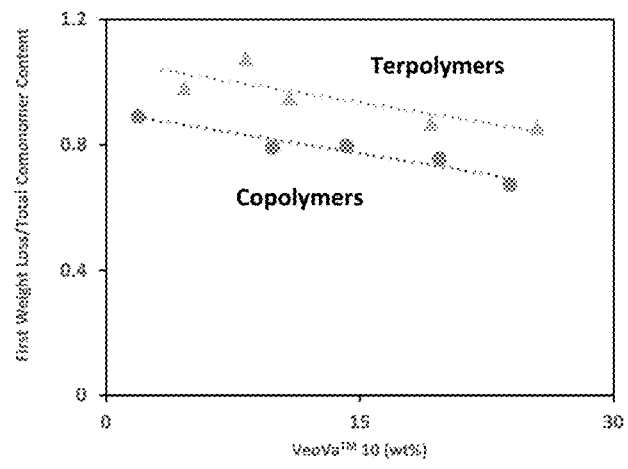
FIG. 9A                    FIG. 9B

POLYETHYLENE COPOLYMERS AND PRODUCTS AND METHODS THEREOF

BACKGROUND

The manufacture of polyolefin materials such as polyethylene (PE) and polypropylene (PP) are the highest production volume of a synthetic polymer ever invented. The success of these materials were greatly achieved due to its low production cost, energy efficiency, low greenhouse gas emission, versatility to produce a wide range of polymers with different properties, and high polymer processability. The wide range of articles produced with polyolefin materials includes films, molded products, foams, pipes, textiles, and the like. These products also have the attractiveness to be recycled by pyrolysis to gas and oil or by incineration to energy. The physical and chemical properties of polyolefin compositions may exhibit varied responses depending on a number of factors such as molecular weight, distribution of molecular weights, content, nature and distribution of comonomer (or comonomers), the presence of short and/or long chain-branches and its distribution, thermal and shear history, and the like, which define their applicability in certain applications. To increase their utilization, polyolefins may be formulated as random and block copolymers with a number of possible comonomers, and as mixtures with a number of potential additives.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a polymer composition, that includes a polymer produced from ethylene, and one or more vinyl carbonyl monomers having the general structure (I):

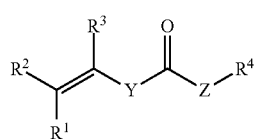

where $R^1$, $R^2$ and $R^3$ are independently selected from a group consisting of hydrogen, halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles; and Y and Z are independently selected from a group consisting of O, $(CR^{5a}R^{5b})$, $(CHR^{6a})$—$R^{6b}$, phenylene, CH—$OR^7$, and $NR^8$, wherein $R^{5a}$, $R^{5b}$, $R^{6a}$, $R^{6b}$, and $R^8$ are independently selected from a group consisting of hydrogen, halogen, $CH_2$, and alkyl, and wherein $R^7$ is independently selected from a group consisting of hydrogen; halogen; hydroxyl; alkyl; linear ether; cyclic ether; $Si(R^9)_3$, wherein $R^9$ is independently selected from a group consisting of hydrogen, halogen, and alkyl; and (C=O)—$R^{10}$, wherein $R^{10}$ is an alkyl; and $R^4$ is independently selected from a group consisting of halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles, and where the polymer composition has a number average molecular weight ($M_n$) ranging from 5 kDa to 10000 kDa obtained by gel permeation chromatography (GPC).

In one aspect, embodiments disclosed herein relate to a polymer composition, that includes a polymer produced from ethylene, and one or more vinyl carbonyl monomers having the general structure (I):

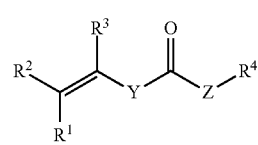

where $R^1$, $R^2$ and $R^3$ are independently selected from a group consisting of hydrogen, halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles; and Y and Z are independently selected from a group consisting of O, $(CR^{5a}R^{5b})$, $(CHR^{6a})$—$R^{6b}$, phenylene, CH—$OR^7$, and $NR^8$, wherein $R^{5a}$, $R^{5b}$, $R^{6a}$, and $R^8$ are independently selected from a group consisting of hydrogen, halogen, $CH_2$, and alkyl, and wherein $R^7$ is independently selected from a group consisting of hydrogen; halogen; hydroxyl; alkyl; linear ether; cyclic ether; $Si(R^9)_3$, wherein $R^9$ is independently selected from a group consisting of hydrogen, halogen, and alkyl; and (C=O)—$R^{10}$, wherein $R^{10}$ is an alkyl; and $R^4$ is independently selected from a group consisting of halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles, and wherein when Y is O, the combined carbon count of Z and $R^4$ is less than 8 or more than 9.

In yet another aspect, embodiments disclosed herein relate to a polymer composition, that includes a polymer produced from ethylene, and one or more vinyl carbonyl monomers having the general structure (II):

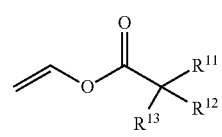

wherein $R^{11}$, $R^{12}$, and $R^{13}$ have a combined carbon number in the range of C3 to C20 and the polymer composition has a number average molecular weight ($M_n$) ranging from 5 kDa to 10000 kDa obtained by GPC.

In yet another aspect, embodiment disclosed herein relate to a polymer composition, that includes: a polymer produced from ethylene, and one or more vinyl carbonyl monomers having the general structure (IV):

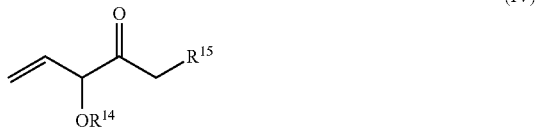

(IV)

wherein $R^{14}$ and $R^{15}$ are independently selected from the group consisting of hydrogen, halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano) alkyl, alkoxyalkyl, hydroxyalkyl, heteroalkyl, substituted cycloalkyl, substituted cycloalkoxy, substituted aryl, substituted heterocycles, and $Si(R^9)_3$, wherein $R^9$ is selected from a group consisting of hydrogen, halogen, and alkyl; linear ether; cyclic ether.

In yet another aspect, embodiments disclosed herein relate to an article prepared from a polymer composition having the above-described features.

In yet another aspect, embodiments disclosed herein relate to a method of preparing a polymer composition that includes adding to a reactor ethylene and one or more vinyl carbonyl monomers having the general structural formulae (I)-(IV) discussed above.

Other aspects and advantages of the claimed subject matter will be apparent from the following description and the appended claims.

BRIEF DESCRIPTION OF DRAWINGS

FIGS. 7A-7C is a graphical depiction of a differential scanning calorimeter (DSC) spectra for a number of samples in accordance with embodiments of the present disclosure.

FIGS. 8A-8B are graphical depictions of a dynamic mechanical analysis (DMA) results for a number of samples in accordance with embodiments of the present disclosure.

FIGS. 9A-9B are graphical depictions of a thermal gravimetric analysis (TGA) thermogram for a number of samples in accordance with embodiments of the present disclosure.

DETAILED DESCRIPTION

Figure 1:
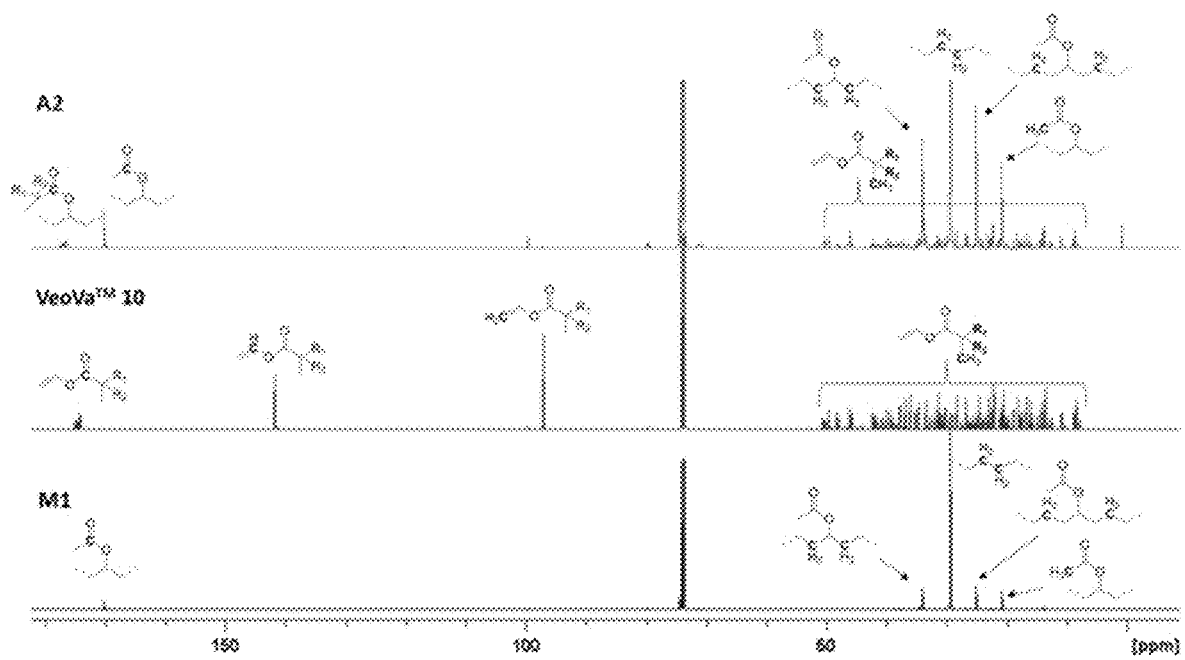
FIG. 1 shows $^{13}$C NMR spectra for a number of samples in accordance with embodiments of the present disclosure.

In one aspect, embodiments disclosed herein relate to polymer compositions containing copolymers prepared from ethylene and one or more vinyl carbonyl and/or diene monomers. In one or more embodiments, polymer compositions may be prepared from a reaction of ethylene and one or more branched vinyl esters and/or diene monomers that modify various properties of the formed copolymer including crystallinity, hardness, melt temperature, glass transition temperature, among others.

Polymer compositions in accordance with the present disclosure may include copolymers incorporating various ratios of ethylene and one or more vinyl esters and/or diene monomers, including one or more branched vinyl esters. In some embodiments, polymer compositions may be prepared by reacting ethylene and a branched vinyl ester in the presence of additional comonomers and one or more radical initiators to form a copolymer. In other embodiments, terpolymers may be prepared by reacting ethylene with a first comonomer to form a polymer resin or prepolymer, which is then reacted with a second comonomer to prepare the final polymer composition, wherein the first and the second comonomer can be added in the same reactor or in different reactors. In one or more embodiments, copolymers may be prepared by reacting ethylene and one or more comonomers at one or more polymerization reaction stages to obtain various repeat unit microstructures. In one or more embodiments, the polymer compositions may include polymers generated from monomers derived from petroleum and/or renewable sources.

Vinyl Carbonyl Monomers

In one or more embodiments, vinyl carbonyl monomers may be described by the general structure (I):

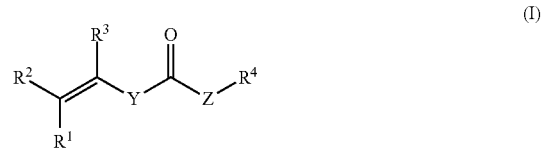

(I)

where $R^1$, $R^2$ and $R^3$ are independently selected from a group consisting of hydrogen, halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano) alkyl, alkoxyalkyl, hydroxyalkyl, heteroalkyl, substituted cycloalkyl, substituted cycloalkoxy, substituted aryl, and substituted heterocycles; and Y and Z are independently selected from a group consisting of O, ($CR^{5a}R^{5b}$), ($CHR^{6a}$)—$R^{6b}$, phenylene, CH—$OR^7$, and $NR^8$, wherein $R^{5a}$, $R^{5b}$, $R^{6a}$, $R^{6b}$, and $R^8$ are independently selected from a group consisting of hydrogen, halogen, $CH_2$, and alkyl, and wherein $R^7$ is independently selected from a group consisting of hydrogen; halogen; hydroxyl; alkyl; linear ether; cyclic ether; $Si(R^9)_3$, wherein $R^9$ is independently selected from a group consisting of hydrogen, and alkyl; and (C=O)—$R^{10}$, wherein $R^{10}$ is an alkyl; and $R^4$ is independently selected from a group consisting of halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles. In one or more embodiments, the number of carbon atoms within Z and $R^4$ may range from a lower limit of 2, 3, or 4 and an upper limit of 12, 16, 20, or 24, where any lower limit can be used in combination with any upper limit. In one or more embodiments, the polymer compositions may include polymers generated from monomers derived from petroleum and/or renewable sources. In some embodiments, polymer compositions may include two or more vinyl carbonyl monomers, including mixtures of isomers.

In one or more embodiments, vinyl carbonyl monomers may include vinyl esters prepared from vinyl alcohol and a carboxylic acid, such as vinyl acetate, vinyl propanoate, vinyl butanoate, vinyl pentanoate, vinyl hexanoate, vinyl 2-methyl butanoate, vinyl 3-ethylpentanoate, vinyl 3-ethylhexanoate, and the like. In one or more embodiments, when Y is O in formula (I) above, Z and $R^4$ may be selected from the above species to have a combined carbon count of less than 8 or more than 9 (in particular, to avoid resulting in neodecanoate and/or neononoate groups) when the $M_n$ is less than 5 kDa. In one or more embodiments, the polymer compositions may include polymers generated from monomers derived from petroleum and/or renewable sources.

In one or more embodiments, vinyl carbonyl monomers may include branched vinyl esters, which may include branched vinyl esters generated from isomeric mixtures of branched alkyl acids. Branched vinyl esters in accordance with the present disclosure may have the general chemical formula (II):

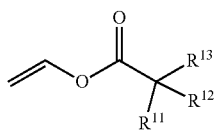
(II)

where $R^{11}$, $R^{12}$, and $R^{13}$ have a combined carbon number in the range of C3 to C20. In some embodiments, $R^{11}$, $R^{12}$, and $R^{13}$ may all be alkyl chains having varying degrees of branching in some embodiments, or a subset of $R^{11}$, $R^{12}$, and $R^{13}$ may be independently selected from a group consisting of hydrogen, alkyl, or aryl in some embodiments.

In one or more embodiments, the vinyl carbonyl monomers may include branched vinyl esters having the general chemical formula (III):

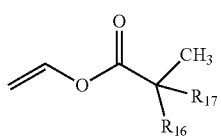
(III)

wherein $R^{16}$ and $R^{17}$ have a combined carbon number of 6 or 7 and the polymer composition has a number average molecular weight (Mn) ranging from 5 kDa to 1000 kDa obtained by GPC. In one or more embodiments, $R^{16}$ and $R^{17}$ may have a combined carbon number of less than 6 or greater than 7, and the polymer composition may have an $M_n$ up to 2000 kDa or 10000 kDa. That is, when the $M_n$ is less than 5 kDa, $R^{16}$ and $R^{17}$ may have a combined carbon number of less than 6 or greater than 7, but if the $M_n$ is greater than 5 kDa, $R^{16}$ and $R^{17}$ may include a combined carbon number of 6 or 7.

Examples of branched vinyl esters may include monomers having the chemical structures, including derivatives thereof:

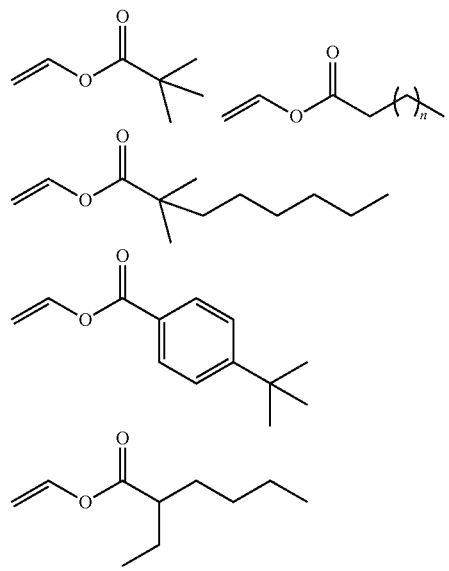

In one or more embodiments, the polymer compositions may include polymers generated from monomers derived from petroleum and/or renewable sources.

In one or more embodiments, branched vinyl esters may include monomers and comonomer mixtures containing vinyl esters of neononanoic acid, neodecanoic acid, and the like. In some embodiments, branched vinyl esters may include Versatic™ acid series tertiary carboxylic acids, including Versatic™ acid EH, Versatic™ acid 9 and Versatic™ acid 10 prepared by Koch synthesis, commercially available from Hexion™ chemicals. In one or more embodiments, the polymer compositions may include polymers generated from monomers derived from petroleum and/or renewable sources.

In one or more embodiments, vinyl carbonyl monomers may have the general chemical formula (IV):

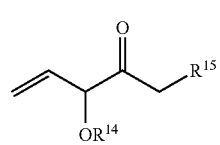
(IV)

where $R^{14}$ and $R^{15}$ are independently selected from the group consisting of hydrogen, halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)

alkyl, alkoxyalkyl, hydroxyalkyl, heteroalkyl, substituted cycloalkyl, substituted cycloalkoxy, substituted aryl, substituted heterocycles, and $Si(R^9)_3$, wherein $R^9$ is selected from a group consisting of hydrogen, halogen, and alkyl; linear ether; cyclic ether. In one or more embodiments vinyl carbonyl monomers may include alkyl vinyl glycolates such as methyl vinyl glycolate, ethyl vinyl glycolate, and the like.

Examples of other vinyl carbonyl monomers according to formula (I) and (IV) also include monomers having the chemical strucures, including derivatives thereof:

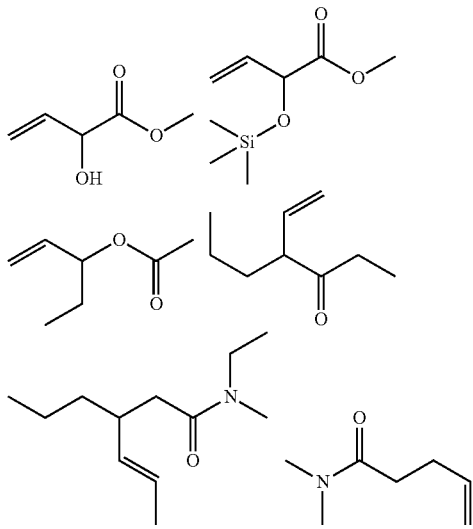

Diene Monomers

In one or more embodiments, the polymer compositions may optionally include diene monomers with the ethylene and one or more vinyl carbonyl monomers discussed above. In some embodiments, diene monomers may have the chemical structures as presented below, including derivatives thereof:

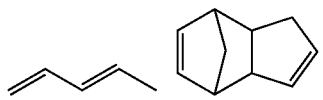

to modify various polymer properties.

Polymer compositions in accordance with the present disclosure may include a percent by weight of ethylene measured by proton nuclear magnetic resonance ($^1$H NMR) and Carbon 13 nuclear magnetic resonance ($^{13}$C NMR) that ranges from a lower limit selected from one of 0.1 wt %, 0.5 wt %, 1 wt %, and 5 wt %, to an upper limit selected from one of 90 wt %, 95 wt %, 99.9 wt %, and 99.99 wt %, where any lower limit may be paired with any upper limit.

In some embodiments, polymer compositions in accordance with the present disclosure may optionally include a percent by weight of vinyl acetate measured by $^1$H NMR and $^{13}$C NMR that ranges from a lower limit selected from one of 0.01 wt %, 0.1 wt %, 0.5 wt %, 1 wt %, 5 wt %, 10 wt %, 20 wt % and 30 wt % to an upper limit selected from 60 wt %, 70 wt %, 80 wt % and 90 wt % where any lower limit may be paired with any upper limit.

Polymer compositions in accordance with the present disclosure may include a percent by weight of vinyl carbonyl monomer (other than vinyl acetate) measured by $^1$H NMR and $^{13}$C NMR that ranges from a lower limit selected from one of 0.01 wt %, 0.1 wt %, 0.5 wt %, 1 wt %, 5 wt %, 10 wt %, 20 wt % and 30 wt % to an upper limit selected from 60 wt %, 70 wt %, 80 wt % and 90 wt % where any lower limit may be paired with any upper limit.

Polymer compositions in accordance with the present disclosure may optionally include a percent by weight of diene monomer measured by $^1$H NMR and $^{13}$C NMR that ranges from a lower limit selected from one of 0.01 wt %, 0.1 wt %, 0.5 wt %, 1 wt %, 5 wt %, 10wt %, 15 wt % and 20 wt % to an upper limit selected from 30 wt %, 35 wt %, 40 wt % and 50 wt % where any lower limit may be paired with any upper limit.

Polymer compositions in accordance with the present disclosure may have a number average molecular weight ($M_n$) in kilodaltons (kDa) measured by gel permeation chromatography (GPC) of the polymer composition ranges from a lower limit selected from one of 1 kDa, 5 kDa, 10 kDa, 20 kDa, and 40 kDa to an upper limit selected from one of 100 kDa, 300 kDa, 500 kDa, 1000 kDa, 2000 kDa, 5000 kDa, or 10000 kDa where any lower limit may be paired with any upper limit.

Polymer compositions in accordance with the present disclosure may have a weight average molecular weight ($M_w$) in kilodaltons (kDa) measured by GPC of the polymer composition ranges from a lower limit selected from one of 1 kDa, 5 kDa, 10 kDa, 15 kDa and 20 kDa to an upper limit selected from one of 40 kDa, 50 kDa, 100 kDa, 200 kDa, 300 kDa, 500 kDa, 1000 kDa, 5000 kDa, 10000 kDa and 20000 kDa where any lower limit may be paired with any upper limit.

Polymer compositions in accordance with the present disclosure may have a molecular weight distribution (MWD, obtained from the ratio between $M_w$ and $M_n$) measured by GPC that has a lower limit of any of 1, 2, 5, or 10, and an upper limit of any of 20, 30, 40, 50, or 60, where any lower limit may be paired with any upper limit.

Initiators for Free-Radical Polymerization

Polymer compositions in accordance with the present disclosure may include one or more initiators for radical polymerization capable of generating free radicals that initiate chain polymerization of comonomers and prepolymers in a reactant mixture. In one or more embodiments, radical initiators may include chemical species that degrade to release free radicals spontaneously or under stimulation by temperature, pH, or other trigger.

In one or more embodiments, radical initiators may include peroxides and bifunctional peroxides such as benzoyl peroxide; dicumyl peroxide; di-tert-butyl peroxide; tert-butyl cumyl peroxide; t-butyl-peroxy-2-ethyl-hexanoate; tert-butyl peroxypivalate; tertiary butyl peroxyneodecanoate; t-butyl-peroxy-benzoate; t-butyl-peroxy-2-ethylhexanoate; tert-butyl 3,5,5-trimethylhexanoate peroxide; tert-butyl peroxybenzoate; 2-ethylhexyl carbonate tert-butyl peroxide; 2,5-dimethyl-2,5-di (tert-butylperoxide) hexane; 1,1-di (tert-butylperoxide)-3,3,5-trimethylcyclohexane; 2,5-dimethyl-2,5-di(tert-butylperoxide) hexyne-3; 3,3,5,7,7-pentamethyl-1,2,4-trioxepane; butyl 4,4-di (tert-butylperoxide) valerate; di (2,4-dichlorobenzoyl) peroxide; di(4-methylbenzoyl) peroxide; peroxide di(tert-butylperoxyisopropyl) benzene; and the like.

Radical initiators may also include benzoyl peroxide, 2,5-di(cumylperoxy)-2,5-dimethyl hexane, 2,5-di(cumylperoxy)-2,5-dimethyl hexyne-3,4-methyl-4-(t-butylperoxy)-2-pentanol, 4-methyl-4-(t-amylperoxy)-2-pentano1,4-methyl-4-(cumylperoxy)-2-pentanol, 4-methyl-4-(t-butylperoxy)-2-pentanone, 4-methyl-4-(t-amylperoxy)-2-pentanone, 4-methyl-4-(cumylperoxy)-2-pentanone, 2,5-dimethyl-2,5-di(t-butylperoxy)hexane, 2,5-dimethyl-2,5-di(t-amylperoxy)hexane, 2,5-dimethyl-2,5-di(t-butylperoxy)hexyne-3, 2,5-dimethyl-2,5-di(t-amylperoxy)hexyne-3, 2,5-dimethyl-2-t-butylperoxy-5-hydroperoxyhexane, 2,5-dimethyl-2-cumylperoxy-5-hydroperoxy hexane, 2,5-dimethyl-2-t-amylperoxy-5-hydroperoxyhexane, m/p-alpha, alpha-di[(t-butylperoxy)isopropyl]benzene, 1,3,5-tris(t-butylperoxyisopropyl)benzene, 1,3,5-tris(t-amylperoxyisopropyl)benzene, 1,3,5-tris(cumylperoxyisopropyl)benzene, di[1,3-dimethyl-3-(t-butylperoxy)butyl]carbonate, di[1,3-dimethyl-3-(t-amylperoxy) butyl]carbonate, di[1,3-dimethyl-3-(cumylperoxy)butyl]carbonate, di-t-amyl peroxide, t-amyl cumyl peroxide, t-butyl-isopropenylcumyl peroxide, 2,4,6-tri(butylperoxy)-s-triazine, 1,3,5-tri[1-(t-butylperoxy)-1-methylethyl]benzene, 1,3,5-tri-[(t-butylperoxy)-isopropyl]benzene, 1,3-dimethyl-3-(t-butylperoxy)butanol, 1,3-dimethyl-3-(t-amylperoxy)butanol, di(2-phenoxyethyl) peroxydicarbonate, di(4-t-butylcyclohexyl)peroxydicarbonate, dimyristyl peroxydicarbonate, dibenzyl peroxydicarbonate, di(isobomyl)peroxydicarbonate, 3-cumylperoxy-1,3-dimethylbutyl methacrylate, 3-t-butylperoxy-1,3-dimethylbutyl methacrylate, 3-t-amylperoxy-1,3-dimethylbutylmethacrylate, tri(1,3-dimethyl-3-t-butylperoxy butyloxy)vinyl silane, 1,3-dimethyl-3-(t-butylperoxy)butyl N-[1-{3-(1-methylethenyl)-phenyl}-1-methylethyl]carbamate, 1,3-dimethyl-3-(t-amylperoxy) butyl N-[1-{3(1-methylethenyl)-phenyl}-1-methylethyl] carbamate, 1,3-dimethyl-3-(cumylperoxy))butyl N-[1-{3-(1-methylethenyl)-phenyl}-1-methylethyl]carbamate, 1,1-di(t-butylperoxy)-3,3,5-trimethylcyclohexane, 1,1-di(t-butylperoxy)cyclohexane, n-butyl 4,4-di(t-amylperoxy) valerate, ethyl 3,3-di(t-butylperoxy)butyrate, 2,2-di(t-amylperoxy)propane, 3,6,6,9,9-pentamethyl-3-ethoxycabonylmethyl-1,2,4,5-tetraoxacyclononane, n-buty 1-4,4OO-t-amyl-O-hydrogen-monoperoxy-succinate, 3,6,9, triethyl-3,6,9-trimethyl-1,4,7-triperoxynonane (or methyl ethyl ketone peroxide cyclic trimer), methyl ethyl ketone peroxide cyclic dimer, 3,3,6,6,9,9-hexamethyl-1,2,4,5-tetraoxacyclononane, 2,5-dimethyl-2,5-di(benzoylperoxy) hexane, t-butyl perbenzoate, t-butylperoxy acetate, t-butylperoxy-2-ethyl hexanoate, t-amyl perbenzoate, t-amyl peroxy acetate, t-butyl peroxy isobutyrate, 3-hydroxy-1,1-dimethyl t-butyl peroxy-2-ethyl hexanoate, OO-t-amyl-O-hydrogen-monoperoxy succinate, OO-t-butyl-O-hydrogen-monoperoxy succinate, di-t-butyl diperoxyphthalate, t-butylperoxy (3,3,5-trimethylhexanoate), 1,4-bis(t-butylperoxycarbo)cyclohexane, t-butylperoxy-3,5,5-trimethylhexanoate, t-butylperoxy-(cis-3-carboxy)propionate, allyl 3-methyl-3-t-butylperoxy butyrate, OO-t-butyl-O-isopropylmonoperoxy carbonate, OO-t-butyl-O-(2-ethyl hexyl) monoperoxy carbonate, 1,1,1-tris[2-(t-butylperoxy-carbonyloxy)ethoxymethyl]propane, 1,1,1-tris[2-(t-amylperoxy-carbonyloxy) ethoxymethyl]propane, 1,1,1-tris[2-(cumylperoxy-cabonyloxy)ethoxymethyl]propane, OO-t-amyl-O-isopropylmonoperoxy carbonate, di(4-methylbenzoyl) peroxide, di(3-methylbenzoyl)peroxide, di(2-methylbenzoyl)peroxide, didecanoyl peroxide, dilauroyl peroxide, 2,4-dibromo-benzoyl peroxide, succinic acid peroxide, dibenzoyl peroxide, di(2,4-dichloro-benzoyl)peroxide, and combinations thereof.

In one or more embodiments, radical initiators may include azo-compounds such as azobisisobutyronitrile (AIBN), 2,2'-azobis(amidinopropyl) dihydrochloride, and the like, azo-peroxide initiators that contain mixtures of peroxide with azodinitrile compounds such as 2,2'-azobis (2-methyl-pentanenitrile), 2,2'-azobis(2methyl-butanenitrile), 2,2'-azobis(2-ethyl-pentanenitrile), 2-[(1-cyano-1-methylpropyl)azo]-2-methyl-pentanenitrile, 2-[(1-cyano-1-ethylpropyl)azo]-2-methyl-butanenitrile, 2-[(1-cyano-1-methylpropyl)azo]-2-ethyl, and the like.

In one or more embodiments, radical initiators may include Carbon-Carbon ("C—C") free radical initiators such as 2,3-dimethyl-2,3-diphenylbutane, 3,4-dimethyl-3,4-diphenylhexane, 3,4-diethyl-3,4-diphenylhexane, 3,4-dibenzyl-3,4ditolylhexane, 2,7-dimethyl-4,5-diethyl-4,5-diphenyloctane, 3,4-dibenzyl-3,4-diphenylhexane, and the like.

In one or more embodiments, polymer compositions in accordance with the present disclosure may be formed from one or more radical initiators present at a percent by weight of the total polymerization mixture (wt %) that ranges from a lower limit selected from one of 0.000001 wt %, 0.0001 wt %, 0.01 wt %, 0.1 wt %, 0.15 wt %, 0.4 wt %, 0.6 wt %, 0.75 wt % and 1 wt %, to an upper limit selected from one of 0.5 wt %, 1.25 wt %, 2 wt %, 4 wt %, and 5 wt %, where any lower limit can be used with any upper limit. Further, it is envisioned that the concentration of the radical initiator may be more or less depending on the application of the final material.

Stabilizers

Polymer compositions in accordance with the present disclosure may include one or more stabilizers capable of preventing polymerization in the feed lines of monomers and comonomers but not hindering polymerization at the reactor.

In one or more embodiments, stabilizers may include nitroxyl derivatives such as 2,2,6,6-tetramethyl-1-piperidinyloxy, 2,2,6,6-tetramethyl-4-hydroxy-1-piperidinyloxy, 4-oxo-2,2,6,6-tetramethyl-1-piperidinyloxy, 2,2,6,6-tetramethyl-4-amino-piperidinyloxy, and the like.

In one or more embodiments, polymer compositions in accordance with the present disclosure be formed from one or more stabilizers present at a percent by weight of the total polymerization mixture (wt %) of one or more stabilizers that ranges from a lower limit selected from one of 0.000001 wt %, 0.0001 wt %, 0.01 wt %, 0.1 wt %, 0.15 wt %, 0.4 wt %, 0.6 wt %, 0.75 wt % and 1 wt %, to an upper limit selected from one of 0.5 wt %, 1.25 wt %, 2 wt %, 4 wt %, and 5 wt %, where any lower limit can be used with any upper limit. Further, it is envisioned that the concentration of the stabilizer may be more or less depending on the application of the final material.

Additives

Polymer compositions in accordance with the present disclosure may include fillers and additives that modify various physical and chemical properties when added to the polymer composition during blending that include one or more polymer additives such as kickers, processing aids, lubricants, antistatic agents, clarifying agents, nucleating agents, beta-nucleating agents, slipping agents, antioxidants, antacids, light stabilizers such as HALS, IR absorbers, whitening agents, organic and/or inorganic dyes, anti-blocking agents, processing aids, flame-retardants, plasticizers, biocides, and adhesion-promoting agents.

Polymer compositions in accordance with the present disclosure may include one or more inorganic fillers such as talc, glass fibers, marble dust, cement dust, clay, carbon black, feldspar, silica or glass, fumed silica, silicates, calcium silicate, silicic acid powder, glass microspheres, mica, metal oxide particles and nanoparticles such as magnesium oxide, antimony oxide, zinc oxide, inorganic salt particles and nanoparticles such as barium sulfate, wollastonite, alumina, aluminum silicate, titanium oxides, calcium carbonate, polyhedral oligomeric silsesquioxane (POSS).

In one or more embodiments, polymer compositions in accordance with the present disclosure may contain a percent by weight of the total composition (wt %) of one or more additives and/or fillers that ranges from a lower limit selected from one of 0.01wt %, 0.02 wt %, 0.05 wt %, 1.0 wt %, 5.0 wt %, 10.0 wt %, 15.0 wt %, and 20.0 wt %, to an upper limit selected from one of 25 wt %, 30 wt %, 40 wt %, 50 wt %, 60 wt %, and 70 wt %, where any lower limit can be used with any upper limit.

Polymer Composition Preparation Methods

In one or more embodiments, polymer compositions in accordance with the present disclosure may be prepared in reactor by polymerizing ethylene and one or more vinyl carbonyl and/or diene monomers. Methods of reacting the comonomers in the presence of a radical initiator may include any suitable method in the art including solution phase polymerization, pressurized radical polymerization, bulk polymerization, emulsion polymerization, and suspension polymerization. In some embodiments, the reactor may be a batch or continuous reactor at pressures below 500 bar, known as low pressure polymerization system. In particular embodiments, the reactor pressure may be above 40 bar, and the reactor temperature may be above 50° C., and including the conditions known as high pressure polymerizations. In one or more embodiments, the reaction is carried out in a low pressure polymerization process wherein the ethylene and one or more vinyl carbonyl are polymerized in a liquid phase of an inert solvent and/or one or more liquid monomer(s). In one embodiment, polymerization comprises initiators for free-radical polymerization in an amount from about 0.0001 to about 0.01 milimoles calculated as the total amount of one or more initiator for free-radical polymerization per liter of the volume of the polymerization zone. The amount of ethylene in the polymerization zone will depend mainly on the total pressure of the reactor in a range from about 20 bar to about 500 bar and temperature in a range from about 20° C. to about 200° C. In one or more embodiments, the pressure in the reactor may have a lower limit of any of 20, 30, 40, 50, 75, or 100 bar, and an upper limit of any of 100, 150, 200, 250, 300, 350, 400, 450 or 500 bar. The liquid phase of the polymerization process in accordance with the present disclosure may include ethylene, one or more vinyl carbonyl monomer, initiator for free-radical polymerization, and optionally one or more inert solvent such as tetrahydrofuran (THF), chloroform, dichloromethane (DCM), dimethyl sulfoxide (DMSO), dimethyl carbonate (DMC), hexane, cyclohexane, ethyl acetate (EtOAc) acetonitrile, toluene, xylene, ether, dioxane, dimethyl-formamide (DMF), benzene or acetone. Copolymers and terpolymers produced under low-pressure conditions may exhibit number average molecular weights of 1 to 300 kDa, weight average molecular weights of 1 to 1000 kDa and MWDs of 1 to 60.

In some embodiments, the comonomers and one or more free-radical polymerization initiators are polymerized in a continuous or batch process at temperatures above 70 ° C. and at pressures above 1000 bar, known as high pressure polymerization systems. For example, a pressure of greater than 1000, 1100, 1200, 1500, 1600, 1700, 1800, 1900, 2000, 2100, 2200, 2300, 2400, 2500, 3000, 5000, or 10000 bar may be used. Copolymers and terpolymers produced under high-pressure conditions may have number average molecular weights ($M_n$) of 1 to 10000 kDa, weight average molecular weights ($M_w$) of 1 to 20000 kDa. Molecular weight distribution (MWD) is obtained from the ratio between the weight average molecular weight ($M_w$) and the number average molecular weight ($M_n$) obtained by GPC. Copolymers and terpolymers produced under high-pressure conditions may have MWDs of 1 to 60.

In some embodiments, the conversion during polymerization in low pressure polymerization and high pressure polymerization systems, which is defined as the weight or mass flow of the produced polymer divided by the weight of mass flow of monomers and comonomers may have a lower limit of any of 0.01%, 0.1%, 1%, 2%, 5%, 7%, 10% and a upper limit of any of 15%, 17%, 20%, 25%, 30%, 35%, 40%, 45%, 50%, 60%, 70%, 80%, 90%, 99% or 100%.

Physical Properties

In one or more embodiments, polymer compositions may have a melt flow rate (MFR) according to ASTM D1238 at 190° C./2.16 kg in a range having a lower limit selected from any of 0.01 g/10 min, 0.5 g/10 min, 1 g/10 min, and 10 g/10 min, to an upper limit selected from any of 50 g/10min, 350 g/10 min, 450 g/10 min, 550 g/10 min, 1000 g/10 min, and 2000 g/10 min, where any lower limit may be paired with any upper limit.

In one or more embodiments, polymer compositions may have crystallinity measured according to ASTM D3418 by differential scanning calorimetry (DSC) or wide angle X-ray diffraction (WAXD) in a range having a lower limit selected from any 0.1%, 1%, 10%, and 20%, to an upper limit selected from any of 60%, 70%, and 80%, where any lower limit may be paired with any upper limit.

In one or more embodiments, polymer compositions may have a glass transition temperature ($T_g$) measured by dynamic mechanical analysis (DMA) or DSC in a range having an upper limit selected from any 100° C., 90° C., and 80° C., to a lower limit selected from any of −50° C., −60° C., and −70° C., where any lower limit may be paired with any upper limit.

In one or more embodiments, polymer compositions may have a melting temperature ($T_m$) measured according to ASTM D3418 by DSC in a range having a lower limit selected from any 20° C., 30° C., and 40° C., to an upper limit selected from any of 100° C., 110° C., 120° C., 130° C., 140° C., and 150° C., where any lower limit may be paired with any upper limit. In some embodiments, polymer compositions may not present a Tm, characterizing a completely amorphous polymer composition.

In one or more embodiments, polymer compositions may have a crystallization temperature ($T_c$) measured according to ASTM D3418 by DSC in a range having a lower limit selected from any 0, 5° C., 10° C., 20° C., and 30° C., and to an upper limit selected from any of 80° C., 90° C., 100° C., 110° C., 120° C., 130° C., 140° C., and 150° C., where any lower limit may be paired with any upper limit.

In one or more embodiments, polymer compositions may have a heat of crystallization measured according to ASTM D3418 by DSC in a range having a lower limit of any of 0, 10, 20, 30, 40, 50, and 60 J/g, and an upper limit of any of 140, 180, 200, 240, and 280 J/g, where any lower limit may be paired with any upper limit.

The polymerization conditions result in the production of polymers having a wide range of molecular weight distribution (MWD). In one of the embodiment, the MWD of a polymer obtained within this polymerization method is from about 1 to about 60, with a lower limit of any of 1, 1.5, 3, 5, or 10, and an upper limit of any of 10, 20, 30, 40, 50 or 60, where any lower limit can be used in combination with any upper limit. However, depending on the amount of comonomer incorporated, samples produced under high-presure conditions show a broad range of MWDs from about 1 to 60. Copolymers and terpolymers produced under low-pressure conditions may exhibit number average molecular weights of 1 to 300 kDa, weight average molecular weights of 1 to 1000 kDa and MWDs of 1 to 60. On the other hand, copolymers and terpolymers produced under high-pressure conditions may show number average molecular weights of 1 to 10000 kDa, weight average molecular weights of 1 to 20000 kDa and MWDs of 1 to 60.

In one or more embodiments, polymer compositions may have a hardness of the polymer composition as determined according to ASTM D2240 in a range having a lower limit selected from any 25, 35, and 45 Shore A, to an upper limit selected from any of 80, 90, and 100 Shore A, where any lower limit may be paired with any upper limit.

In one or more embodiments, polymer compositions may have a hardness of the polymer composition as determined according to ASTM D2240 in a range having a lower limit selected from any 10, 20, and 30 Shore D, to an upper limit selected from any of 50, 60, and 70 Shore D, where any lower limit may be paired with any upper limit.

In one or more embodiments, polymer compositions may have a percent elongation, tensile strength, and modulus as determined according to ASTM D368 in a range having a lower limit selected from any 10, 50, and 100 percent elongation, to an upper limit selected from any of 500, 1000, and 2000 percent elongation, a lower limit selected from any 1, 5, and 10 MPa tensile strength, to an upper limit selected from any of 15, 30, 70, 100, 200, and 500 MPa tensile strength, a lower limit selected from any 0.1, 1, 5, 20, and 40 MPa modulus, to an upper limit selected from any of 100, 200, 300, 500, 1000, 2000, 5000, and 10000 MPa modulus, and where any lower limit may be paired with any upper limit.

In one or more embodiments, polymer compositions may have a density according to ASTM D792 in a range having a lower limit selected from any of 0.75 g/cm$^3$, 0.85 g/cm$^3$, and 0.89 g/cm$^3$, to an upper limit selected from any of 1.1 g/cm$^3$, 1.2 g/cm$^3$, and 1.3 g/cm$^3$, where any lower limit may be paired with any upper limit.

In one or more embodiments, polymer compositions may have a bio-based carbon content, as determined by ASTM D6866-18 Method B, in a range having a lower limit selected from any of 1%, 5%, 10%, and 20%, to an upper limit selected from any of 60%, 80%, 90%, and 100%, where any lower limit may be paired with any upper limit.

In one or more embodiments, polymers may have a long chain branching frequency ranging from 0 to 10, such as from a lower limit of any of 1, 0.5, 1, or 1.5 and an upper limit of any of 2, 4, 6, 8, or 10, where any lower limit may be paired with any upper limit.

In one or more embodiments, long chain branching average LCBf may be calculated from GPC analysis using a GPC instrument equipped with IR5 infrared detector and a four-capillary viscometry detector, both from Polymer Char. Data collection was performed using Polymer Char's software. The concentration measured by IR5 detector was calculated considering that the whole area of the chromatogram was equivalent to the elution of 100% of the mass injected. Average LCBf was then calculared according to:

$$LCBf = \frac{1000\, B_n R}{M_w}$$

where R is the molar mass of the repeated unit and is calculated based on the contribution of monomer and comonomers, considering the mol percentage of each one, determined by NMR. $M_w$ is the weight average molecular weight and is calculated according to the following equation by means of universal calibration:

$$M_w = \left[\frac{\Sigma(N_i M_i^2)}{\Sigma(N_i M_i)}\right]$$

Average $B_n$ constant is calculated according to:

$$g = \left[\left(1+\frac{B_n}{7}\right)^{1/2} + \frac{4 B_n}{9\pi}\right]^{-1/2}$$

Average g' and g constants are calculated according to:

$$g' = \frac{IV_{Branched}}{IV_{Linear}}$$

$$g' = g^\varepsilon$$

$\varepsilon$ is known as the viscosity shielding ratio and is assumed to be constant and equal to 0.7.

The intrinsic viscosity of the branched samples ($IV_{branched}$) may be calculated using the specific viscosity ($\eta_{sp}$) from the viscometer detector as follows.

$$IV_{branched} = \frac{\Sigma_i (\eta_{sp})_i \Delta V_i}{SA} \frac{1}{10 KIV}$$

where SA is sample amount, KIV is viscosity detector constant and the volume increment ($\Delta V$) is a constant determined by the difference between consecutive retention volumes ($\Delta V = RV_{i+1} - RV_i$).

The intrinsic viscosity of the linear counterpart ($IV_{linear}$) may be calculated using Mark-Houwink equation, whereas the Mark-Houwink constants are obtained from the intrinsic viscosity considering the concentration from Stacy-Haney method as follows. The Stacey-Haney IV ($IV_{SH}$) is calculated based on Stacy-Haney concentration by $$IV_{SH_i} = \frac{1}{KIV} \frac{\eta_{sp_i}}{C_{SH_i}},$$

where $C_{SH}$ is found from $$C_{SHi} = \frac{(ln\eta_{rel})_i K}{(hv)_i^{a/a+1}}$$

whereas $\eta_{rel}$ is the relative viscosity ($\eta_{rel}=\eta_{sp}+1$), $(hv)_i$ is the hydrodynamic volume at each elution volume slice from the universal calibration curve and the Mark-Houwink exponent, a, was defined as 0.725, reference value for a linear polyethylene homopolymer and the constant, K, is calculated according to:

$$K = \frac{\frac{SA}{\Delta V}}{\frac{\Sigma(ln\eta_{rel})_i}{(hv)_i^{a/a+1}}}$$

From $IV_{SH_i}$ the molecular weight ($M_{SH}$) on each elution volume slice is also obtained according to $$M_{SH_i} = \frac{hv_i}{IV_{SH_i}}$$

Plotting $IV_{SH_i}$ versus $M_{SH_i}$, both in log scale, leads to Mark-Houwink constants k and a for the linear polymer. Finally, $IV_{linear}$ may be calculated as:

$$IV_{linear} = kM_v^a$$

where $M_v$ is the viscosity average molecular weight by means of universal calibration and the concentration by IR5 infrared detector, and is calculated according to:

$$M_v = \left[\frac{\Sigma(N_i M_i^{a+1})}{\Sigma(N_i M_i)}\right]^{1/a}$$

where $N_i$ is the number of ith molecules with molecular weight of $M_i$. The $M_i$ is obtained considering the concentration by IR5 infrared detector and the hydrodynamic volume from the universal calibration $$(M_i = \frac{hv_i}{\frac{1}{KIV}\frac{\eta_{spi}}{c_{IR_i}}}).$$

$M_i$ is plotted against the retention volume, the noisy extremes of the curve are removed and then extrapolated using a third order fit polynomial. The equation derived from this 3° order fit polynomial is used to calculate the $M_i$ as a function of retention volume. In one or more embodiments, polymers may have a long chain branching frequency, calculated by GPC analysis, ranging from 0 to 10, such as from a lower limit of any of 1, 0.5, 1, or 1.5 and an upper limit of any of 2, 4, 6, 8, or 10, where any lower limit may be paired with any upper limit.

In one or more embodiments, polymers may have a long chain branching content, measured by $^{13}$CNMR, ranging from 0 to 10, such as a lower limit of any of 0, 0.2, 0.4, 0.6, 0.8, or 1 and an upper limit of any of 2, 4, 6, 8, or 10, where any lower limit may be paired with any upper limit.

In $^{13}$CNMR analysis, long chain branching (LCB) is defined as any branch with six or more carbons. Based on $^{13}$CNMR spectra, LCB content ($B_{6+}$) in branched polymers is calculated from:

$$B_{6+} = S_{3,\,Polymer} - S_{3,\,vinyl\,carbonyl\,monomers}$$

where the $S_3$ peak is positioned at 32.2 ppm on a $^{13}$CNMR spectrum. This method takes into account both branches ($B_{6+}$) and the chain ends of the main chain, where the effect of the long branches in the vinyl carbonyl monomer is corrected using its $^{13}$CNMR spectrum, and the effect of chain ends can also be corrected with GPC data.

In one or more embodiments, the polymers may have, after thermal fractionation by successive self-nucleation and annealing (SSA), a heat flow versus temperature curve that has 0 to 20 minimums, such as a lower limit of any of 0, 1, 2, 3, 4, 5, 6, 7, 8, 9, or 10 minimums and an upper limit of any of 12, 14, 16, 18, or 20 minimums, where any lower limit may be paired with any upper limit, where the minimums may be allocated in the temperature ranges of 140-150° C., 130-140° C., 120-130° C., 110-120° C., 100-110° C., 90-100° C., 80-90° C., 70-80° C., 60-70° C., 50-60° C., 40-50° C., 30-40° C., 20-30° C., 10-20° C., and/or 0-10° C. Such thermal fractionation may use a temperature protocol (a series of heating and cooling cycles) to produce a distribution of lamellar crystals whose sizes reflect the distribution of methyl sequence lengths in the copolymers and terpolymers. The thermal fractionation may be carried out in a TA Instruments Discovery DSC 2500, under nitrogen. All cooling cycles may be carried out at 5° C./min, and heating cycles may be carried out at 20° C./min. Samples may be heated from 25° C. to 150° C., held at 150° C. for 5 min, cooled to 25° C. and held at this temperature for 3 min. The sample may subsequently be heated to the first annealing temperature (140° C.), held at this temperature for 5 min and cooled to 25° C. The sample may then be heated again to the next annealing temperature (130° C.), held at this temperature for 5 min and cooled to 25° C. The procedure may be repeated in steps of 10° C. until the last annealing temperature (such as, but not limited to, 0° C.) is reached. Then, the sample may be heated to 150° C., at 20° C./min in order to obtain the melting profile.

In one or more embodiments, polymers may have a thermal stability, measured by thermal gravimetric analysis (TGA), where the ratio of weight loss between 250 to 400° C. relative to the total comonomer content ranges from 0 to 2, such as a lower limit of any of 0, 0.1, 0.2, 0.3, 0.4, 0.5, 0.6, 0.7, 0.8, 0.9, and 1, and an upper limit of any of 1.2, 1.4, 1.6, 1.8, or 2, where any lower limit may be paired with any upper limit.

In one or more embodiments, polymers may have a storage modulus at 0° C. of 1 to 50 GPa, such as a lower limit of any of 1, 2, 5, 10, 20, 40, 60, 80, or 100 MPa, and an upper limit of any of 200 MPa, 300 MPa, 400 MPa, 500 MPa, 700 MPa, 1 GPa, 5 GPa, 10 GPa, 20 GPa, 30 GPa, 40 GPa, or 50 GPa where any lower limit may be paired with any upper limit.

In one or more embodiments, polymers may have one to two relaxation maximums in the tan δ versus temperature plot between −75 to 75° C. where the peak at the higher temperature is designated as α and the peak at lower temperature is designated as β. In one or more embodiments, $T_α$ (temperature corresponding to the α peak) can vary between −75 to 75° C., such as a lower limit of any of −75, −60, −50, −40, −30, −20, −10, or 0° C., and an upper limit of any of 10, 20, 30, 40, 50, 60, or 75° C., where any lower may be paired with any upper limit. In one or more embodiments, $T_\beta$ (temperature corresponding to the β peak) can vary between −75 to 50° C., such as a lower limit of any of −75, −60, −50, −40, −30, −20, −10, or 0° C., and an upper limit of any of 10, 20, 30, 40, or 50° C., where any lower may be paired with any upper limit.

APPLICATIONS

In one or more embodiments, polymer compositions can be used in various molding processes, including extrusion molding, injection molding, thermoforming, cast film extrusion, blown film extrusion, foaming, extrusion blow-molding, ISBM (Injection Stretched Blow-Molding), 3D printing, rotomolding, pultrusion, and the like, to produce manufactured articles.

Polymer compositions in accordance with the present disclosure may also be formulated for a number of polymer articles, including the production of seals, hoses, footwear insoles, footwear midsoles, footwear outsoles, automotive parts and bumpers, sealing systems, hot melt adhesives, films, conveyor belts, sportive articles, rotomolded articles, primers, in civil construction as linings, industrial floors, acoustic insulation, and the like.

In one or more embodiments, polymer compositions may be included in polymer blends with one or more polymer resins. In some embodiments, polymer compositions may be formulated as a masterbatch that is added at a percent by weight of 1 wt % to 99 wt % to a polymer resin.

The following examples are merely illustrative, and should not be interpreted as limiting the scope of the present disclosure.

EXAMPLE 1

Ethylene vinyl acetate (EVA) copolymers account for a large portion of the ethylene copolymer market and have a range of properties dependent on the vinyl acetate content. An increase in vinyl acetate incorporation results in a decrease in crystallinity, glass transition temperature, melting temperature, and chemical resistance while increasing optical clarity, impact and stress crack resistance, flexibility and adhesion. In this example, ethylene-based polymers incorporating various amounts of vinyl acetate and a vinyl carbonyl monomer VeoVa™ 10 from HEXION™ (a mixture of isomers of vinyl esters of versatic acid having a carbon number of 10) were produced to assay a number of polymer properties for the resulting compositions.

Ethylene (99.95%, Air Liquide, 1200 psi), VeoVa™ 10 (Hexion) and 2,2'-azobisisobutyronitrile (AIBN, 98% Sigma Aldrich) were used as received. Dimethyl carbonate (DMC, anhydrous 99%, Sigma Aldrich), and vinyl acetate (99%, Sigma Aldrich) were distilled before use and stored under nitrogen.

Synthesis of terpolymers with ethylene, vinyl acetate and VeoVa™ 10 (Samples A1-A5)

Polymer compositions were prepared using a free radical polymerization of the comonomer mixtures in solution by combining 80 g of dimethyl carbonate (DMC), 9.97 or 14.98 g of vinyl acetate, 13.5 or 11.48 g VeoVa™ 10, and 0.1 g of azobisisobutyronitrile (AIBN) to a Parr reactor. The reactor was sealed and flushed 3 times with ethylene with 1000 psi of pressure while stirring. The system was then heated at 70° C. at an ethylene pressure of 1200 psi and stirred for 2 hours. The reaction mixture was collected and the reactor was washed with THF at 60° C. The solvent in the reaction mixture and wash was removed by rotary evaporation. The resulting polymer was dissolved in THF and precipitated into cold methanol, then vacuum filtered.

EXAMPLE 2

Ethylene-based polymers incorporating various amounts of vinyl pivalate, vinyl laurate and vinyl 4-tert-butylbenzoate were produced to assay a number of polymer properties for the resulting compositions.

Ethylene (99.95%, Air Liquide, 1200 psi) and azobisisobutyronitrile (AIBN, 98% Sigma Aldrich) were used as received. Dimethyl carbonate (DMC, anhydrous 99%, Sigma Aldrich), vinyl acetate (99%, Sigma Aldrich), vinyl pivalate (99%, Sigma Aldrich), vinyl laurate (99%, Sigma Aldrich) and vinyl 4-tert-butylbenzoate (99%, Sigma Aldrich) were distilled before use and stored under nitrogen.

Synthesis of terpolymers with ethylene, vinyl acetate and vinyl pivalate, vinyl laurate and vinyl 4-tert-butylbenzoate (Samples B1-B3)

Polymer compositions were prepared using a free radical polymerization of the comonomer mixtures in solution by combining 80 g of dimethyl carbonate (DMC), 9.3 g of vinyl acetate and 13.9 g of vinyl pivalate or 24.4 g of vinyl laurate or 22 g vinyl 4-tert-butylbenzoate, and 0.1 g of azobisisobutyronitrile (AIBN) to a Parr reactor. The reactor was sealed and flushed 3 times with ethylene with 1000 psi of pressure while stirring. The system was then heated at 70° C. at an ethylene pressure of 1200 psi and stirred for 2 hours. The reaction mixture was collected and the reactor was washed with THF at 60° C. The solvent in the reaction mixture and wash was removed by rotary evaporation. The resulting polymer was dissolved in THF and precipitated into cold methanol, then vacuum filtered.

EXAMPLE 3

Ethylene-based polymers incorporating various amounts of vinyl acetate and a vinyl carbonyl monomer VeoVa™ 10 from HEXION™, a mixture of isomers of vinyl esters of versatic acid having a carbon number of 10 under high-pressure conditions were produced to assay a number of polymer properties for the resulting compositions.

Ethylene, VeoVa™ 10 (Hexion), tertbutylperoxy-2-ethylhexanoate, heptane (99%, Sigma Aldrich), and vinyl acetate (99%, Sigma Aldrich) were used as received.

Synthesis of terpolymers with ethylene, vinyl acetate and VeoVa™ 10 were performed under high-pressure conditions (Samples D1-D15).

Polymer compositions were prepared using a continuous free radical polymerization™ 10, heptane and tertbutylperoxy-2-ethylhexanoate into a high-pressure reactor. Before each round of polymerization, the reactor was purged five times with 2200-2300 bars of ethylene. Each reaction began by heating the reactor to 200° C. and feeding ethylene to a pressure of 1900-2000 bar. A continuous flow of ethylene with a rate of 2000 g/hr was then fed into the reactor. Once the targeted pressure and stable ethylene flow was achieved, the comonomers were added to the reactor. The mixture of initiator and heptane was introduced to the system at a flow rate of 2 mL/hr. The reaction mixtures was collected and the reactor was washed with xylene at 145° C. The resulting polymer was dissolved in xylene and precipitated into cold methanol, then vacuum filtered.

EXAMPLE 4

In this example, an ethylene-based polymer was produced by incorporating trimethylsilyl-protected methyl vinyl glycolate to assay a number of polymer properties for the resulting compositions.

Ethylene (99.95%, Air Liquide, 1200 psi) and azobisisobutyronitrile (AIBN, 98% Sigma Aldrich) were used as received. Dimethyl carbonate (DMC, anhydrous 99%, Sigma Aldrich) was distilled before use and stored under nitrogen.

Synthesis of copolymer with ethylene and trimethylsilyl-protected methyl vinyl glycolate (Sample E1)

8 g trimethylsilyl-protected methyl vinyl glycolate, 80 g dimethyl carbonate and 0.1 g of azobisisobutyronitrile were added to a 300 mL Parr reactor. The reactor was sealed and flushed three times with 1000 psi pressure of nitrogen while stirring. The system was then heated, at 70° C. at an ethylene pressure of 1200 psi and allowed to stir for the desired time. The reaction mixture was collected and the reactor was washed with THF at 60° C. The solvent in the reaction mixture and wash was removed by rotary evaporation. The resulting polymer was dissolved in THF and precipitated into cold methanol, then vacuum filtered.

EXAMPLE 5

In this example, an ethylene-based polymer was produced by incorporating vinyl acetate and trimethylsilyl-protected methyl vinyl glycolate to assay a number of polymer properties for the resulting compositions.

Ethylene (99.95%, Air Liquide, 1200 psi) and azobisisobutyronitrile (AIBN, 98% Sigma Aldrich) were used as received. Dimethyl carbonate (DMC, anhydrous 99%, Sigma Aldrich) and vinyl acetate (99%, Sigma Aldrich) were distilled before use and stored under nitrogen.

Synthesis of terpolymer with ethylene, vinyl acetate and trimethylsilyl-protected methyl vinyl glycolate (Sample E2)

5 g trimethylsilyl-protected methyl vinyl glycolate, 15 g vinyl acetate, 80 g dimethyl carbonate and 0.1 g of azobisisobutyronitrile were added to a 300 mL Parr reactor. The reactor was sealed and flushed three times with 1000 psi pressure of nitrogen while stirring. The system was then heated, at 70° C. at an ethylene pressure of 1200 psi and allowed to stir for the desired time. The reaction mixture was collected and the reactor was washed with THF at 60° C. The solvent in the reaction mixture and wash was removed by rotary evaporation. The resulting polymer was dissolved in THF and precipitated into cold methanol, then vacuum filtered.

EXAMPLE 6

In this example, ethylene-based polymers incorporating by incorporating methyl vinyl glycolate under high pressure conditions were produced to assay a number of polymer properties for the resulting compositions.

Ethylene and tertbutylperoxy-2-ethylhexanoate were used as received. Toluene (99%, Sigma Aldrich) was distilled before use and stored under nitrogen.

Synthesis of copolymers with ethylene and methyl vinyl glycolate under high pressure conditions (Samples E3-E4)

Polymer compositions were prepared using a batch free radical polymerization of the comonomer mixture by combining 0.45 g methyl vinyl glycolate, toluene and various amounts of tertbutylperoxy-2-ethylhexanoate into a high-pressure reactor. Before each round of polymerization, the reactor was purged five times with 2200-2300 bars of ethylene. Each reaction began by heating the reactor to 200° C. and feeding ethylene to a pressure of 1900-2000 bar. Once the targeted pressure and stable ethylene flow was achieved, the comonomers were added to the reactor. The mixture of initiator and toluene was then introduced to the system. The reaction mixtures were collected, and the reactor was washed with xylene at 145° C. The resulting polymer was dissolved in xylene and precipitated into cold methanol, then vacuum filtered.

Polymer Characterization

Twenty-seven samples of ethylene-based polymers denoted A1-A5, B1-B3, D1-D15 and E1-E4 were purified and characterized. The ethylene-based polymers contained varying amounts of both vinyl acetate and a vinyl carbonyl monomer.

TABLE 1

Reaction Summary with NMR and GPC Results for Examples 1 to 6

| Samples | Vinyl Acetate (wt %)$^{a,b}$ | VeoVa™ 10 (wt %)$^{a,b}$ | Vinyl Pivalate (wt %)$^{a,b}$ | Vinyl Laurate (wt %)$^{a,b}$ | Vinyl 4-tert-butyl bezoate (wt %)$^{a,b}$ | Methyl Vinyl Glycolate (w %)$^{a,b}$ | Trimethylsilyl-Protected Methyl Vinyl Glycolate (w %)$^{a,b}$ | $M_w$ (kDa) | $M_n$ (kDa) | MWD | Conversion (%) |
|---|---|---|---|---|---|---|---|---|---|---|---|
| A1 | 11.4 | 23.4 | — | — | — | — | — | 27.0 | 13.0 | 2.1 | — |
| A2 | 10.2 | 18.7 | — | — | — | — | — | 25.9 | 11.3 | 2.3 | — |
| A3 | 9.1 | 22.2 | — | — | — | — | — | 20.3 | 10.1 | 2.0 | — |
| A4 | 14.4 | 26.1 | — | — | — | — | — | 18.7 | 8.3 | 2.3 | — |
| A5 | 14.7 | 22.6 | — | — | — | — | — | 22.6 | 10.3 | 2.2 | — |
| B1 | 11.2 | — | 16.7 | — | — | — | — | 23.4 | 8.1 | 2.9 | — |
| B2 | 9.5 | — | — | 27.7 | — | — | — | 22.3 | 5.1 | 4.4 | — |
| B3 | 16.0 | — | — | — | 47.4 | — | — | 11.9 | 4.2 | 2.8 | — |
| D1 | — | 3.3 | — | — | — | — | — | 1173.3 | 67.7 | 17.3 | 17.5 |
| D2 | — | 4.6 | — | — | — | — | — | 996.7 | 61.1 | 16.3 | 14.5 |
| D3 | — | 8.3 | — | — | — | — | — | 537.6 | 48.9 | 11.0 | 15.8 |
| D4 | — | 10.8 | — | — | — | — | — | 425.1 | 41.9 | 10.1 | 8.2 |
| D5 | — | 19.2 | — | — | — | — | — | 220.6 | 22.7 | 9.7 | 6.7 |
| D6 | — | 25.5 | — | — | — | — | — | 207.2 | 24.3 | 8.5 | 4.8 |
| D7 | 4.8 | 23.9 | — | — | — | — | — | 64.2 | 19.0 | 3.4 | 4.2 |
| D8 | 10.2 | 19.7 | — | — | — | — | — | 55.5 | 16.9 | 3.3 | 5.9 |
| D9 | 15.7 | 14.2 | — | — | — | — | — | 57.6 | 20.2 | 2.9 | 15.6 |
| D10 | 20.5 | 9.9 | — | — | — | — | — | 55.1 | 17.3 | 3.2 | 16.4 |
| D11 | 25.0 | 1.9 | — | — | — | — | — | 75.3 | 19.8 | 3.8 | 14.2 |
| D12 | 29.1 | — | — | — | — | — | — | 52.8 | 15.3 | 3.4 | 16.9 |
| D13 | — | 22.4 | — | — | — | — | — | 52.1 | 10.7 | 4.9 | 5 |
| D14 | 21.2 | 8.4 | — | — | — | — | — | 48.6 | 11.6 | 4.2 | 6 |

TABLE 1-continued

Reaction Summary with NMR and GPC Results for Examples 1 to 6

| Samples | Vinyl Acetate (wt %)[a,b] | VeoVa™ 10 (wt %)[a,b] | Vinyl Pivalate (wt %)[a,b] | Vinyl Laurate (wt %)[a,b] | Vinyl 4-tert-butyl bezoate (wt %)[a,b] | Methyl Vinyl Glycolate (w %)[a,b] | Trimethylsilyl-Protected Methyl Vinyl Glycolate (w %)[a,b] | $M_w$ (kDa) | $M_n$ (kDa) | MWD | Conversion (%) |
|---|---|---|---|---|---|---|---|---|---|---|---|
| D15 | 25.8 | 5.0 | — | — | — | — | — | 56.5 | 10.5 | 5.4 | 12.2 |
| E1 | — | — | — | — | — | — | 10.3 | 2.8 | 1.0 | 2.8 | — |
| E2 | 30.1 | — | — | — | — | — | 1.1 | 3.6 | 1.3 | 2.8 | — |
| E3 | — | — | — | — | — | 0.89 | — | 184.7 | 6.1 | 30.5 | — |
| E4 | — | — | — | — | — | 5.01 | — | 97.3 | 3.9 | 25.1 | — |
| M1 | 28[a] | — | — | — | — | — | — | 78.5 | 13.5 | 5.8 | — |
| M2 | 28[a] | — | — | — | — | — | — | 59.3 | 14.5 | 4.1 | — |

[a] Determined from $^1$H NMR;
[b] Determined from $^{13}$C NMR;
MW and MWD are found using a GPC equipped with a viscometer detector.
Conversion is calculated using mass flow of monomers and produced polymer.

Table 1 provides a summary of the gel permeation chromatography (GPC) and nuclear magnetic resonance (NMR) data for all polymers synthesized and two comparative commercial EVA samples M1-M2.

For the polymer samples containing the vinyl carbonyl monomers, incorporation was determined using quantitative $^{13}$C NMR, since the $^1$H NMR contained significant overlap in both the carbonyl and alkyl regions for accurate integration. The carbonyl peaks not observed in pure EVA $^{13}$C NMR were identified as coming from the branched vinyl carbonyl monomer units and used to calculate the weight percent of the comonomer.

With particular respect to FIG. 1, the full $^{13}$C NMR spectra (TCE-D$_2$, 393.1 K, 125 MHz) for the VeoVa™ acid 10 monomer and representative samples A2 and M1 are shown. There is evidence of incorporation of the branched vinyl ester seen in both the carbonyl (170-180 ppm) and alkyl regions (0-50 ppm). The spectra show a significant increase in the peaks indicative of carbonyl carbons and long alkyl chains within the branched vinyl ester. General peak assignments are also shown in FIG. 1. When comparing spectra of the VeoVa™ acid 10 monomer and the polymer A2, the polymer spectrum exhibits a disappearance of the vinyl peaks and appearance of peaks corresponding to all three comonomers studied (ethylene, vinyl acetate, and VeoVa™ acid 10). The abundant number of peaks in both regions may be due to the mixture of isomers in the VeoVa™ acid 10 monomer, and the appearance of these peaks in the polymer samples validates the formation of the respective terpolymer.

Figure 2:
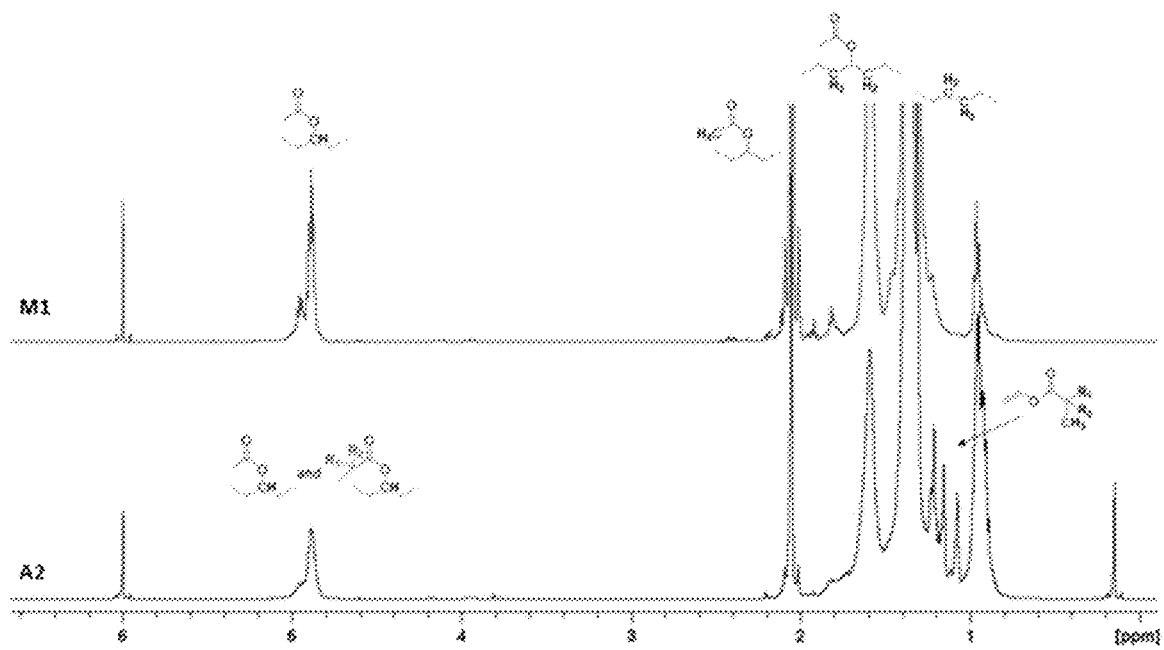
FIG. 2 shows $^1$H NMR spectra for a number of samples in accordance with embodiments of the present disclosure.

Further evidence of the incorporation of the VeoVa™ acid 10 monomer is demonstrated in FIG. 2 showing the $^1$H NMR spectra (TCE-D$_2$, 393.2 K, 500 MHz) for the polymer samples A2 and M1. The spectra exhibit peaks for vinyl acetate and ethylene as well as additional peaks in the alkyl region (0.5-1.5 ppm) indicative of the long alkyl chains on the branched vinyl ester monomer.

The $^1$H NMR spectrum (TCE-D$_2$, 393.2 K, 500 MHz) for A2 and M1 are shown with a number of relevant peak assignments. FIG. 2 shows that there is overlap between vinyl acetate and the branched vinyl ester monomer units around the peaks slightly upfield from 5 ppm. If these peaks were purely the methine of ethyl acetate, the integral ratio between the 5 ppm peaks and the peak around 2 ppm (methyl from vinyl acetate) would be 1:3. However, the integral ratio is 1:1, indicating that the methines of both vinyl acetate and branched vinyl ester overlap, generating the broadened peaks around 5 ppm. Relative intensity of the peaks found in $^1$H NMR and $^{13}$C NMR spectra are used to calculate monomer incorporation of vinyl ester and VeoVa™ 10 in the co-/terpolymers.

Figure 3:
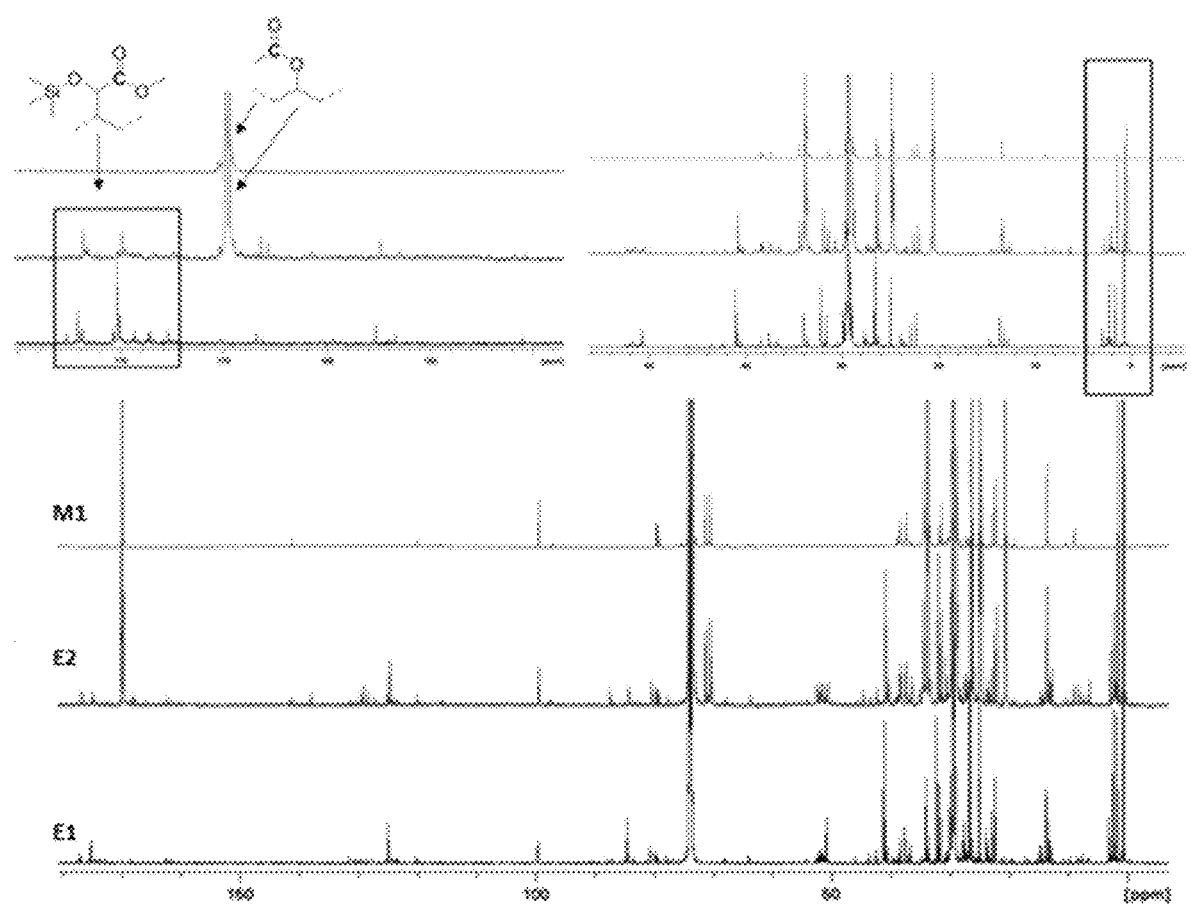
FIG. 3 shows $^{13}$C NMR spectra for a number of samples in accordance with embodiments of the present disclosure.

With particular respect to FIG. 3, the full $^{13}$C NMR spectra (TCE-d$_2$, 393.1 K, 125 MHz) for samples E1 and E2 are shown. There is evidence of incorporation of the trimethylsilyl-protected methyl vinyl glycolate seen in the 175 ppm, 125 ppm and 50 ppm regions. General peak assignments are also shown in FIG. 3.

Figure 4:
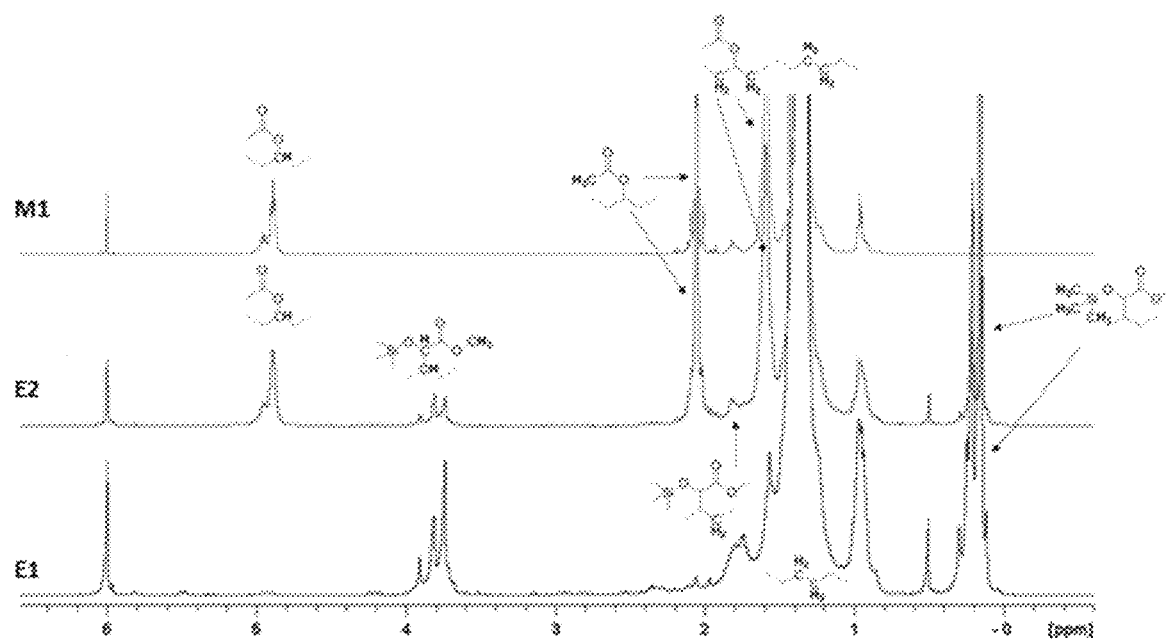
FIG. 4 shows $^1$H NMR spectra for a number of samples in accordance with embodiments of the present disclosure.

Further evidence of the incorporation of the trimethylsilyl-protected methyl vinyl glycolate monomer is demonstrated in FIG. 4 showing the $^1$H NMR spectra (TCE-d$_2$, 393 K, 500 MHz) for the polymer samples E1 and E2. The spectra exhibit peaks for vinyl acetate and ethylene as well as additional peaks (1.8 ppm and 3.8 ppm) indicative of the trimethylsilyl-protected methyl vinyl glycolate monomer.

With particular respect to Table 1, a broad range of conversions are obtained for each polymer. The degree of conversion during polymerization will affect the degree of branching and topology of the chains, altering properties of the polymers.

Figure 5:
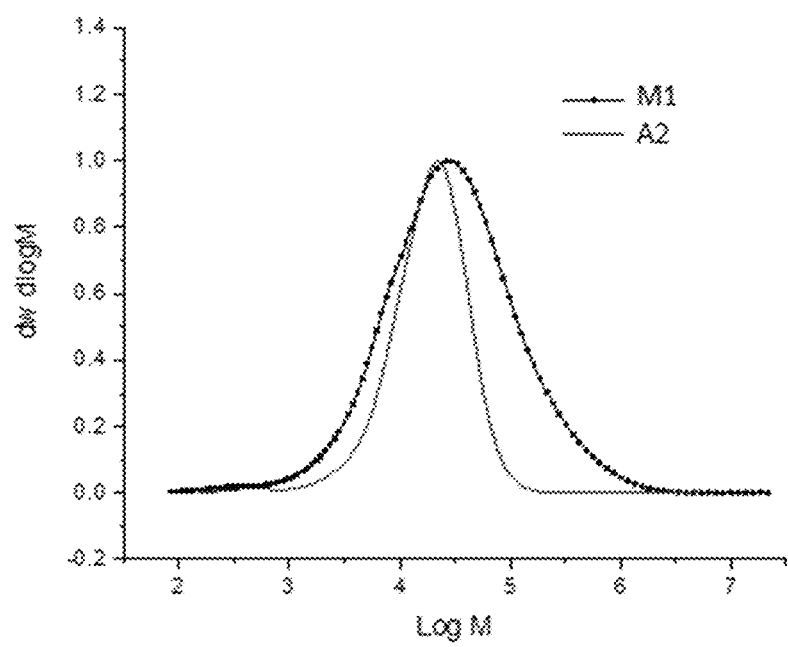
FIG. 5 is a graphical depiction of viscometer gel permeation chromatography (GPC) chromatograph obtained for a number of samples in accordance with embodiments of the present disclosure.

With particular respect to FIG. 5, a gel permeation chromatograph is shown for the samples, from which the molecular weights and distributions of the terpolymers were derived. The GPC experiments were carried out in a gel permeation chromatography coupled with triple detection, with an infrared detector IR5 and a four bridge capillary viscometer, both from PolymerChar and an eight angle light scattering detector from Wyatt. It was used a set of 4 column, mixed bed, 13 µm from Tosoh in a temperature of 140° C. The conditions of the experiments were: concentration of 1 mg/mL, flow rate of 1 mL/min, dissolution temperature and time of 160° C. and 90 minutes, respectively and an injection volume of 200 µL. The solvent used was TCB (Trichloro benzene) stabilized with 100 ppm of BHT.

The polymers A1-A5 containing VeoVa™ 10 exhibit molecular weights ranging for 10 to 30 kDa and MWD around 2. Similar MWD is observed for polymers B1-B3 and E1-E2. While the traces of the terpolymers are similar to that of the comparative commercial samples (M1-M3), they differ in their molecular weight distribution, the commercial grades show a broader range of molecular weights with MWD ranging from 4-6. However, depending on the amount of comonomer incorporated, samples produced under high-pressure conditions (polymers D1-D15 and E3-E4) show a broad range of MWDs from about 2 to 31. Copolymers and terpolymers produced under low-pressure conditions usually exhibit number average molecular weights 1 to 300 kDa, weight average molecular weights of 1 to 1000 kDa and MWDs of 1 to 60. On the other hand, copolymers and terpolymers produced under high-pressure conditions typically show number average molecular weights of 1 to 10000 kDa, weight average molecular weights of 1 to 20000 kDa and MWDs of 1 to 60. Due to presence of high molecular weight chains in these polymers, they can show unique properties compared to their low MWD counterparts (such as higher melt strength, ESCR, impact strength, etc.).

Figure 6A:
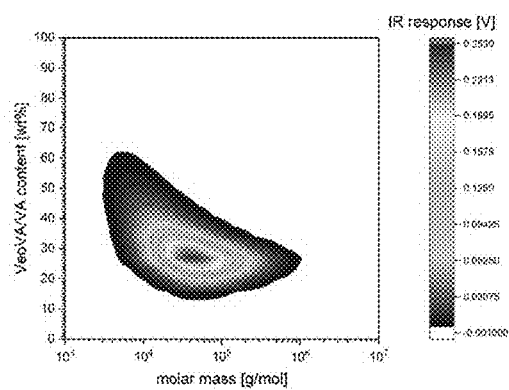
FIGS. 6A-6C are graphical depictions of a two-dimensional liquid chromatography (2D-LC) chromatographs for a number of samples in accordance with embodiments of the present disclosure.
Figure 6B:
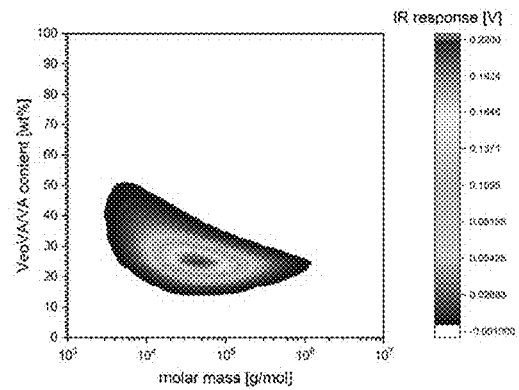
Figure 6C:
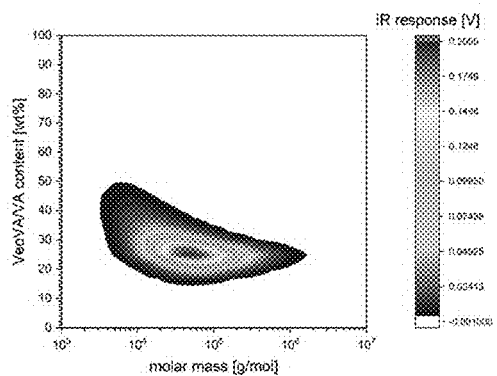

With particular respect to FIGS. 6A-6C, two-dimensional liquid chromatography (2D-LC) chromatographs of polymers D13-D15 are respectively shown. The 2D-LC system analyzed these copolymer and terpolymers using high performance liquid chromatography (HPLC) and GPC instruments. 2D-LC measurements were performed using a PolymerChar 2D-LC high-temperature chromatograph (Valencia, Spain). The instrument was equipped with a Hypercard™ HPLC column (100×4.5 mm L×I.D., 5 μm particle size) and a PLgel Olexis GPC column (300×7.5 mm L×I.D., 13 μm particle size). The sample loop for 2D-LC contains a volume of 200 μL. All experiments were performed at 160° C. Detection was realized with a fixed wavelength infrared (IR) detector (IR6, PolymerChar), with detection capabilities (bandpass filters) for overall polymer concentration, CH2, CH3 and C=O. GPC elution times were calibrated with polystyrene (EasiCal PS-1, Agilent, Waldbronn, Germany). The calibration was performed in GPC mode and applied to 2D-LC results as well. HPLC mobile phase was 1-decanol (Merck, Darmstadt, Germany)/1,2-dichlorobenzene (ODCB, Acros Organics, Schwerte, Germany), with a flow rate of 0.01 mL/min. Gradient conditions: 0-200 min: pure 1-decanol, 200-700 min: linear gradient of 1-decanol to ODCB, 700-1100 min: pure ODCB. Afterwards, the column was flushed with 1-decanol at 0.8 mL/min for 40 min to reestablish the adsorption equilibrium. GPC mobile phase was 1,2-dichlorobenzene (ODCB, Acros Organics, Schwerte, Germany) with a flow rate of 1.5 mL/min. HPLC eluent from the fractionation valve sample loops (100 μL) was injected into the GPC every 10 min. Sample concentrations were approximately 8 mg/mL, 6 mL mobile phase were automatically added to the sample vials (containing weighed polymer) by the autosampler, while simultaneously flushing them with nitrogen. The samples were dissolved for 1 h, under shaking, prior to injection. For calibration of HPLC elution times of EVA, EVA samples with average vinyl acetate contents of 70, 50, 30, 14 and 5 wt % were used. All samples were mixed (similar concentration, ca. 2 mg) and analyzed in a single 2D-LC run. For calibration of HPLC elution times of VeoVA, a similar approach with samples D1-D6 was used. Except for the low molecular weight fraction, all polymers show a uniform distribution of vinyl acetate and VeoVa™ 10 over the molar mass distribution. Concentration of vinyl acetate and VeoVa™ 10 in the polymer chains varies between 10 to 65 wt % in these polymers.

To analyze the long chain branching frequency (LCBf) the samples were analyzed using a GPC instrument equipped with IR5 infrared detector and a four-capillary viscometry detector, the results of which are shown in Table 2.

TABLE 2

Summary of LCBf Results

| Samples | g' | g | $B_n$ | LCBf |
|---|---|---|---|---|
| D5 | 0.715 | 0.620 | 8.048 | 1.284 |
| D6 | 0.663 | 0.556 | 11.426 | 1.117 |
| D7 | 0.878 | 0.830 | 2.173 | 0.547 |
| D8 | 0.852 | 0.795 | 2.815 | 0.717 |
| D10 | 0.927 | 0.897 | 1.155 | 0.334 |
| D12 | 0.934 | 0.907 | 1.020 | 0.318 |
| D14 | 0.948 | 0.926 | 0.787 | 0.270 |
| D15 | 0.853 | 0.797 | 2.779 | 0.634 |

The content of long chain branching on several polymer samples was measured $^{13}$CNMR and the method described herein, the results of which are summarized in Table 3 below.

TABLE 3

Summary of LCB Content Results

| Samples | $B_{6+}$ |
|---|---|
| D1 | 1.725 |
| D5 | 1.010 |
| D7 | 1.065 |
| D10 | 1.338 |
| D12 | 1.973 |
| D14 | 1.312 |
| D15 | 1.182 |

Thermal property analysis of the polymers was carried out using Differential Scanning calorimetry (DSC), and Dynamic Mechanical Analysis (DMA). With particular respect to FIG. 7A-7C, DSC analysis of EVA and terpolymer samples is shown in FIG. 7A, where FIGS. 7B-7C provide an expanded view of the peaks in FIG. 7A. During DSC analysis, these samples were equilibrated at 140° C. for 5 min and the measurement proceeded at a cooling rate of 10° C./min followed by equilibration at −50.0° C. and a heating rate of 10° C./min up to 140° C.

Table 4 summarizes the DSC and DMA data. When comparing the polymers containing the branched vinyl ester comonomer with the comparative samples, the crystallization temperature appears most affected from the incorporation of branched vinyl ester comonomers. This trend is expected from the crystallization interruption caused by the branched groups arising in the polymer from introduction of the vinyl ester comonomers. Introduction of vinyl carbonyl comonomers into a copolymer of ethylene and vinyl acetate may result in a terpolymer with a different morphology from EVA copolymers. This monomer may disrupt the structural regularity and the polymer's ability to pack into a crystalline state. Consequently, by increasing the amorphous regions the $T_g$, $T_m$ and $T_c$ of the obtained polymer may decrease.

Heat of crystallization (ΔH), crystallization temperature, melting temperature for polymers made in Examples 1 to 3 and commercial EVA samples is shown in Table 4. The analyses were carried out under nitrogen in a TA Q2000 instrument. A sample was heated to 160° C. at 10° C./min, held at this temperature for 1 minute, cooled down to −20° C. at 10° C./min and held at this temperature for 1 minute. Then, the sample was heated up to 160° C. at 10° C./min. The cooling and second heating curves were recorded, analyzed by setting the baseline endpoints and the crystallization peak temperature, melting peak temperature and ΔH were obtained.

TABLE 4

DSC, DMA, MFI and Density results for Example 1, 2 and 3

| Samples | $T_c$ peak (° C.) | $T_m$ peak (° C.) | Endothermic ΔH (J/g) | Tg (° C.) | MFI (g/10 min) | Density (g/cm³) |
|---|---|---|---|---|---|---|
| A1 | 46 | 70 | 12.4 | −24 | — | — |
| A2 | 40 | 66 | 9.9 | −25 | — | — |
| A3 | 31 | 51 | 1.5 | −34 | — | — |
| A4 | 34 | 59 | 1.6 | −35 | — | — |
| A5 | 36 | 58 | 6.3 | −41 | — | — |
| B1 | 44 | 63 | 19.9 | −17 | — | — |
| B2 | 43 | 56 | 17.2 | −24 | — | — |
| B3 | 18 | 39 | 10.7 | 9.2 | — | — |
| D1 | 100 | 111 | 140 | 50 to −5 | — | — |
| D2 | 99 | 112 | 136 | 50 to −10 | — | — |
| D3 | 95 | 107 | 123 | 47 to −10 | — | — |
| D4 | 92 | 106 | 117 | 45 to −15 | — | — |
| D5 | 83 | 97 | 97 | 50 to −20 | — | — |
| D6 | 79 | 93 | 83 | −20 | — | — |
| D7 | 67 | 84 | 69 | −24 | — | — |
| D8 | 63 | 80 | 62 | −24 | — | — |
| D9 | 62 | 78 | 61 | −23 | — | — |
| D10 | 58 | 75 | 57 | −22 | — | — |
| D11 | 59 | 76 | 63 | −21 | — | — |
| D12 | 53 | 72 | 60 | −20 | 26.5 | — |
| D13 | 74 | 90 | 96 | −18 | 118 | 0.9129 |
| D14 | 60 | 77 | 64 | −22 | 150 | 0.9290 |
| D15 | 57 | 75 | 56 | −16 | 95 | 0.9321 |
| M1 | 52 | 73 | 19.2 | −19 | — | — |
| M2 | 53 | 74 | 21.9 | −20 | — | — |
| M3 | 86 | 101 | 113 | 6.3 | — | — |

TABLE 5

Storage modulus results for Example 3

| Samples | Storage Modulus at 0° C. (MPa) |
|---|---|
| D1 | 582 |
| D2 | 465 |
| D3 | 366 |
| D4 | 354 |
| D5 | 191 |
| D6 | 76 |
| D7 | 40 |
| D8 | 33 |
| D9 | 31 |
| D10 | 26 |
| D11 | 43 |
| D12 | 26 |

Glass transition temperature ($T_g$) for the samples were determined from the measurement of Tan δ peak maximum of the samples during DMA measurements using a TA 800 DMA instrument in the tensile mode. Thin films made of each samples were cooled to −150° C. and their viscoelastic response was evaluated through temperature sweep with a rate of 3° C./min while a preload force of 0.01 N with a frequency of 1 Hz and amplitude of 30 µm was aplied. Storage modulus, loss modulus, and tan δ (ratio of storage to loss modulus) was recorded as a function of temperature. A reference temperature of 0° C. was selected to compare the storage modulus of the samples. In the range of −75° C. to 75° C. the samples showed one to two maximums in the tan δ versus temperature plot. In the case where there is one peaks in the range of −75° C. to 75° C., it is designated as the α peak. In the case where there is two peaks in the range of −75° C. to 75° C. , the maximum at higher temperature is designated as the α relaxation while the maximum at the lower temperature is marked as the β relaxation. Different polymer morphology is also discernible in DMA results. With particular respect to FIGS. 8A-8B, DMA of D2-D7, D9, and D11 are shown. D2-D6 show a broad relaxation from −50 to 75° C. By increasing the amount of branched vinyl ester comonomer, the intensity of the α relaxation peak decreases while the intensity of the β relaxation peak increases. D4 shows the broadest relaxation in this region. Similar to commercial EVA samples, samples D7, D9, and D11 show single relaxation in this range.

With particular respect to Table 4, copolymers and terpolymers produced in the Examples also show a broad range of MFR and densities. Table 5 summarizes the storage modulus results at 0° C. for Example 3, which depending on different morphologies, cover a broad range of values.

Thermal degradation of the polymers was studied by thermal gravimetric analysis (TGA) under a nitrogen atmosphere. The sample is place in a TA Q500 TGA instrument and heated from 25 to 700° C. with heating rate of 20° C./min. Weight loss as a function of temperature is recorded. With particular respect to FIG. 9A-9B, TGA of D7-D10 is shown. All these polymers contain about 30 wt % comonomers. The first weight loss in thermogram of these polymers (at lower temperatures) is related to separation of acidic groups (acetic acid or versatic acid) from the polymer. The second weight loss at higher temperatures corresponds to degradation of the polymer backbone. Replacing vinyl acetate with VeoVa™ 10 during high pressure polymerization leads to polymers that are more stable and show less weight loss at lower temperatures. FIG. 9B shows that as the amount of VeoVa™ 10 in the copolymers and terpolymers increases, the intensity of the first weight lost (ratio of the amount of first weight loss divided by the total comonomer content) decreases and the copolymer and terpolymers become more thermally stable. The second degradation occurs after 400° C., where the carbon-carbon bonds in the polymer backbone begins to degrade.

Figure 10A:
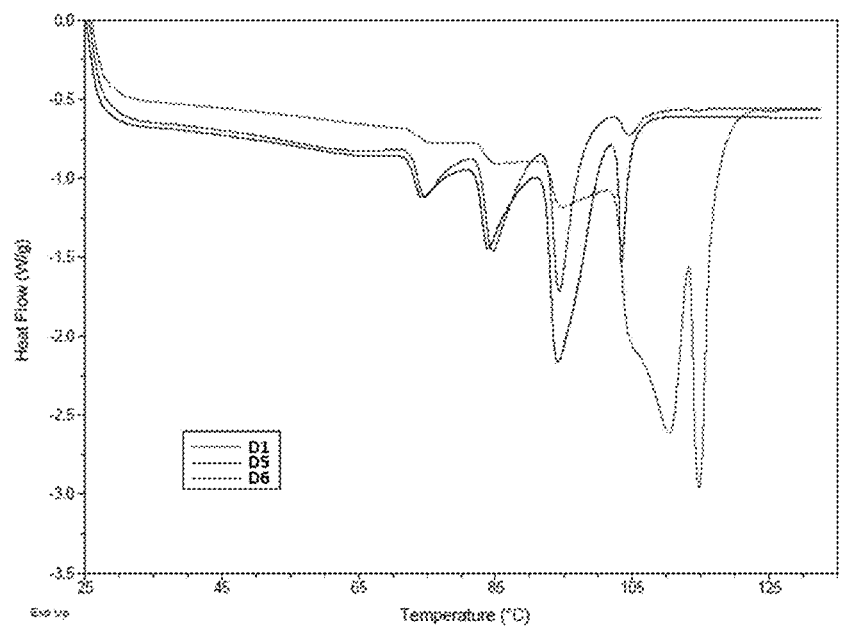
FIGS. 10A-10B are graphical depictions of a successive self-nucleation and annealing (SSA) results for a number of samples in accordance with embodiments of the present disclosure.
Figure 10B:
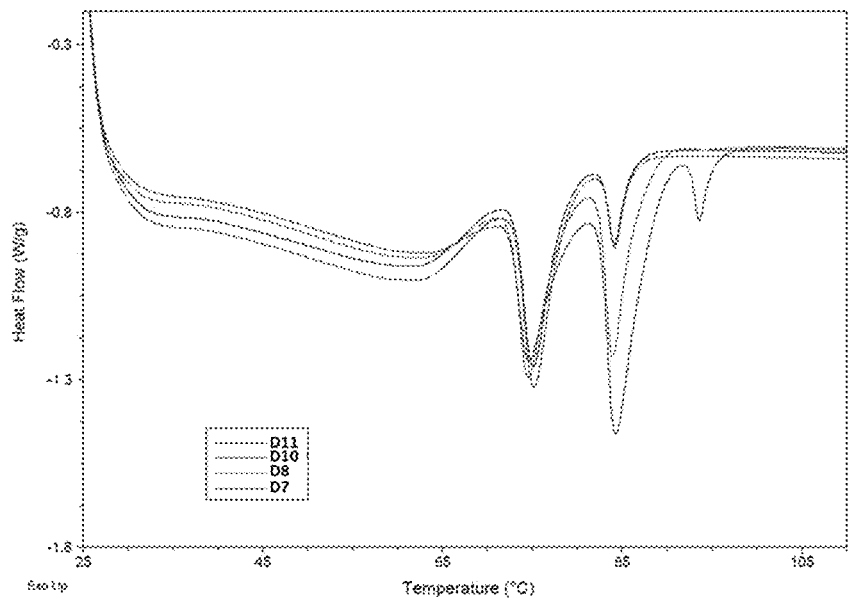

Samples were also subjected to thermal fractionation. Thermal fractionation employs a temperature protocol (a series of heating and cooling cycles) to produce a distribution of lamellar crystals whose sizes reflect the distribution of methyl sequence lengths in the copolymers and terpolymers. The thermal fractionation was carried out in a TA Instruments Discovery DSC 2500, under nitrogen. All cooling cycles were carried out at 5° C./min and heating cycles were carried out at 20° C./min. Samples were heated from 25° C. to 150° C., held at 150° C. for 5 min, cooled to 25 C.° and held at this temperature for 3 min. The sample was subsequently heated to the first annealing temperature (140° C.), held at this temperature for 5 min and cooled to 25° C. The sample was heated again to the next annealing temperature (130° C.), held at this temperature for 5 min and cooled to 25° C. The procedure was repeated until the last annealing temperature (70° C.), in steps of 10° C. Then, the sample was heated to 150° C., at 20° C./min in order to obtain the melting profile. Annealing temperatures include: 140° C., 130° C., 120° C., 110° C., 100° C., 100° C., 90° C., 80° C. and 70° C. The thermal fractionation by SSA results in FIGS. 10A-10B.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:
1. A polymer composition, comprising:
a polymer produced from ethylene, and one or more vinyl carbonyl monomers having the general structure (I):

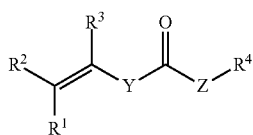

(I)

where $R^1$, $R^2$ and $R^3$ are independently selected from a group consisting of hydrogen, halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles; and Y and Z are independently selected from a group consisting of O, $(CR^{5a}R^{5b})$, $(CHR^{6a})$—$R^{6b}$, phenylene, and CH—$OR^7$, and $NR^8$, wherein $R^{5a}$, $R^{5b}$, $R^{6a}$, $R^{6b}$, and $R^8$ are independently selected from a group consisting of hydrogen, halogen, $CH_2$, and alkyl, and wherein $R^7$ is independently selected from a group consisting of hydrogen; halogen; hydroxyl; alkyl; linear ether; cyclic ether; $Si(R^9)_3$, wherein $R^9$ is independently selected from a group consisting of hydrogen, halogen, and alkyl; and (C=O)—$R^{10}$, wherein $R^{10}$ is an alkyl; and $R^4$ is independently selected from a group consisting of halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles;
where the polymer composition has a number average molecular weight ($M_n$) ranging from 5 kDa to 10000 kDa, and a molecular weight distrution ranging from 1.5 to 60, obtained by GPC.

2. The polymer composition of claim 1, wherein Y or Z is CH—$OR^7$, wherein $R^7$ is selected from a group consisting of hydrogen; alkyl; $Si(R^9)_3$, wherein $R^9$ is selected from a group consisting of hydrogen, halogen, and alkyl; linear ether; cyclic ether; and (C=O)—$R^{10}$, wherein $R^{10}$ is an alkyl.

3. The polymer composition of claim 1, wherein the one or more vinyl carbonyl monomers comprise a mixture of isomers.
4. The polymer composition of claim 1, wherein Y is O.
5. The polymer composition of claim 1, wherein $R^1$, $R^2$, and $R^3$ are hydrogen.
6. The polymer composition of claim 1, wherein the general structure of Z is $C(R^{5a}R^{5b})$, and wherein $R^{5a}$ and $R^{5b}$ are each independently selected from a group consisting of hydrogen, halogen, and alkyl.
7. The polymer composition of claim 1, wherein the polymer composition further comprises one or more diene monomers.
8. The polymer composition of claim 7, wherein the one or more diene monomers are present at a percent by weight of the polymer composition (wt %) ranging from greater than 0.01 wt % to 50 wt % measured by $^1$H NMR and/or $^{13}$C NMR.
9. The polymer composition of claim 7, wherein the one or more diene monomers are selected from the group consisting of dicyclopentadiene, 1,3-pentadiene and combinations thereof.
10. The polymer composition of claim 1, wherein the one or more vinyl carbonyl monomers are present at a percent by weight of the polymer composition (wt %) ranging from greater than 0.01 wt % to 90 wt % measured by $^1$H NMR and/or $^{13}$C NMR.
11. The polymer composition of claim 1, wherein the crystallinity of the polymer composition is in the range of 0.1% to 80% measured by DSC, according to ASTM D3418, or WAXD.
12. The polymer composition of claim 1, wherein the glass transition temperature of the polymer composition is in the range of −70° C. to 100° C. measured by DMA or DSC.
13. The polymer composition of claim 1, wherein the melting temperature of the polymer composition, according to ASTM D3418, is in the range of 0° C. to 150° C. measured by DSC.
14. The polymer composition of claim 1, wherein the crystallization temperature of the polymer composition, according to ASTM D3418, is in the range of 0° C. to 150° C. measured by DSC.
15. The polymer composition of claim 1, wherein the long chain branching frequency ranges from 0 to 10, as measured by GPC.
16. The polymer composition of claim 1, wherein the long chain branching content ranges from 0 to 10, as measured by $^{13}$CNMR.
17. The polymer composition of claim 1, wherein the polymer has a heat flow versus temperature curve, measured by thermal fractionation by successive self-nucleation and annealing with 10° C. steps, that has 0 to 20 minimums.
18. The polymer composition of 17, wherein the minimums are in a temperature range of 0 to 150° C.
19. The polymer composition of claim 1, wherein a ratio of a first weight loss, between 250 to 400° C., relative to a total comonomer content, ranges from 0 to 2.
20. The polymer composition of claim 1, wherein the polymer has a storage modulus at 0° C. ranging from 0.1 MPa to 50 GPa.
21. The polymer composition of claim 1, wherein the polymer has 1 to 2 relaxation maximums in a tan δ versus temperature plot between −75 to 75° C.
22. The polymer composition of claim 21, wherein $T_\alpha$ varies between −75 and 75° C.
23. The polymer composition of claim 22, wherein $T_\beta$ varies between −75 and 50° C.

24. The polymer composition of claim 1, wherein the hardness of the polymer composition as determined according to ASTMD2240 is in the range of 35 to 90 Shore A.

25. The polymer composition of claim 1, wherein the hardness of the polymer composition as determined according to ASTMD2240 is in the range of 20 to 60 Shore D.

26. The polymer composition of claim 1, wherein the MFR according to ASTM D1238 at 190° C./2.16 kg is in the range of 0.01 g/10 min to 1000 g/10 min.

27. The polymer composition of claim 1, wherein the density according to ASTM D1505/D792 is in the range of 0.85 g/cm$^3$ to 1.3 g/cm$^3$.

28. The polymer composition of claim 1, wherein the bio-based carbon content according to ASTM D6866-18 is in the range of 1% to 100%.

29. The polymer composition of claim 1, wherein the polymer composition is prepared by solution phase polymerization.

30. The polymer composition of claim 1, wherein the polymer composition is prepared by low pressure polymerization.

31. The polymer composition of claim 1, wherein the polymer composition is prepared by high-pressure polymerization.

32. The polymer composition of claim 1, wherein the polymer is produced with the addition of one or more initiators for free-radical polymerization added at a percent by weight of the total composition ranging from $10^{-7}$ wt % to 5 wt %.

33. The polymer composition of claim 1, wherein the one or more vinyl carbonyl monomers have the general structure (II):

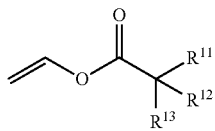

(II)

wherein $R^{11}$, $R^{12}$, and $R^{13}$ have a combined carbon number in the range of C3 to C20 and the polymer composition has a number average molecular weight ($M_n$) ranging from 5 kDa to 10000 kDa obtained by GPC.

34. The polymer composition of claim 33, wherein the one or more vinyl carbonyl monomers have the general structure (III):

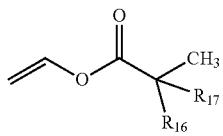

(III)

wherein $R^{16}$ and $R^{17}$ have a combined carbon number of 6 or 7 and the polymer composition has a number average molecular weight ($M_n$) ranging from 5 kDa to 10000 kDa obtained by GPC.

35. The polymer composition of claim 1, wherein the polymer composition further comprises a vinyl acetate monomer.

36. The polymer composition of claim 35, wherein the polymer composition comprises a vinyl acetate monomer content at a percent by weight (wt %) of the polymer composition ranging from greater than 0.01 wt % to 90 wt % measured by $^1$H NMR and/or $^{13}$C NMR.

37. A polymer composition, comprising:
a polymer produced from ethylene, and one or more vinyl carbonyl monomers having the general structure (I):

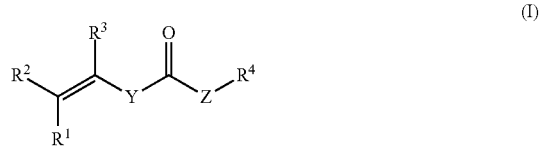

(I)

where $R^1$, $R^2$ and $R^3$ are independently selected from a group consisting of hydrogen, halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles; and Y and Z are independently selected from a group consisting of O, (CR$^{5a}$R$^{5b}$), (CHR$^{6a}$)—R$^{6b}$, phenylene, and CH—OR$^7$, and NR$^8$, wherein $R^{5a}$, $R^{5b}$, $R^{6a}$, $R^{6b}$, and $R^8$ are independently selected from a group consisting of hydrogen, halogen, CH$_2$, and alkyl, and wherein $R^7$ is independently selected from a group consisting of hydrogen; halogen; hydroxyl; alkyl; linear ether; cyclic ether; Si(R$^9$)$_3$, wherein $R^9$ is independently selected from a group consisting of hydrogen, halogen, and alkyl; and (C=O)—R$^{10}$, wherein $R^{10}$ is an alkyl; and $R^4$ is independently selected from a group consisting of halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles
wherein when Y is O, the combined carbon count of Z and $R^4$ is less than 8 or more than 9; and
wherein the polymer composition has a number average molecular weight ($M_n$) ranging from 5 kDa to 10000 kDa, and a molecular weight distribution ranging from 1.5 to 60, obtained by GPC.

38. A polymer composition, comprising:
a polymer produced from ethylene, and one or more vinyl carbonyl monomers having the general structure (IV):

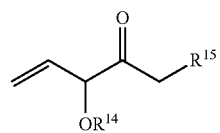

(IV)

wherein $R^{14}$ and $R^{15}$ are independently selected from the group consisting of hydrogen, halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, substituted heterocycles, and $Si(R^9)_3$, wherein $R^9$ is selected from a group consisting of hydrogen, halogen, and alkyl; linear ether; cyclic ether.

39. An article prepared from the polymer composition of claim 1.

40. The article of claim 39, wherein the article is a seal, a hose, a footwear insole, a footwear midsole, a footwear outsole, an automotive bumper, sealing systems, hot melt adhesives, films, conveyor belts, sportive articles, rotomolded articles, primers, linings, industrial flooring, and acoustic insulation.

41. A method of preparing a polymer composition, the method comprising:
adding to a reactor ethylene, and one or more vinyl carbonyl monomers having the general structure:

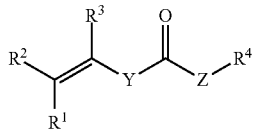

where $R^1$, $R^2$ and $R^3$ are independently selected from a group consisting of hydrogen, halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles; and Y and Z are independently selected from a group consisting of O, $(CR^{5a}R^{5b})$, $(CHR_{6a})$—$R^{6b}$, phenylene, and CH—$OR^7$, and $NR^8$, wherein $R^{5a}$, $R^{5b}$, $R^{6a}$, $R^{6b}$, and $R^8$ are independently selected from a group consisting of hydrogen, halogen, $CH_2$, and alkyl, and wherein $R^7$ is independently selected from a group consisting of hydrogen; halogen; hydroxyl; alkyl; linear ether; cyclic ether; $Si(R^9)_3$, wherein $R^9$ is independently selected from a group consisting of hydrogen, halogen, and alkyl; and (C=O)—$R^{10}$, wherein $R^{10}$ is an alkyl; and $R^4$ is independently selected from a group consisting of halogen, hydroxyl, alkyl, substituted alkyl, alkoxy, substituted alkoxy, alkenyl, substituted alkenyl, alkynyl, substituted alkynyl, aralkyl, (heterocyclo)alkyl, (heteroaryl)alkyl, (amino)alkyl, (alkylamino)alkyl, (dialkylamino)alkyl, carboxamino(alkyl), (cyano)alkyl, alkoxyalkyl, hydroxyalkyl, heteroalkyl, substituted cycloalkyl, substituted cycloalkoxy, substituted aryl, and substituted heterocycles; and reacting the ethylene and one or more vinyl carbonyl monomers to produce the polymer composition with a number average molecular weight ($M_n$) ranging from 5 kDa to 10000 kDa, and a molecular weight distribution ranging from 1.5 to 60, obtained by GPC.

42. The method of any claim 41, wherein the one or more vinyl carbonyl monomers comprise vinyl acetate and one or more comonomers.

43. The method of claim 41, wherein the method further comprises adding one or more diene comonomer to the reactor.

44. The method of claim 41, wherein the reactor is a high-pressure reactor.

45. The method of claim 41, wherein the pressure applied in the reactor is 40 to 4,000 bar.

46. The method of claim 41, wherein the temperature in the reactor during the reaction is 50° C. to 350° C.

* * * * *